United States Patent
Iwano et al.

(10) Patent No.: US 10,532,574 B2
(45) Date of Patent: Jan. 14, 2020

(54) METHOD OF MANUFACTURING LIQUID EJECTING HEAD, AND LIQUID EJECTING HEAD

(71) Applicant: CANON KABUSHIKI KAISHA, Tokyo (JP)

(72) Inventors: Takuya Iwano, Inagi (JP); Yukuo Yamaguchi, Tokyo (JP); Toshiaki Hirosawa, Hiratsuka (JP); Hiromasa Amma, Kawasaki (JP); Soji Kondo, Yokohama (JP); Noriyasu Nagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/799,083

(22) Filed: Oct. 31, 2017

(65) Prior Publication Data

US 2018/0141339 A1    May 24, 2018

(30) Foreign Application Priority Data

Nov. 24, 2016    (JP) .................. 2016-228133

(51) Int. Cl.
| | | |
|---|---|---|
| *B41J 2/16* | (2006.01) | |
| *B29C 45/00* | (2006.01) | |
| *B41J 2/14* | (2006.01) | |
| *B29L 31/00* | (2006.01) | |

(52) U.S. Cl.
CPC ......... *B41J 2/1637* (2013.01); *B29C 45/0062* (2013.01); *B41J 2/14* (2013.01); *B41J 2/1601* (2013.01); *B41J 2/1623* (2013.01); *B29L 2031/767* (2013.01)

(58) Field of Classification Search
None
See application file for complete search history.

(56) References Cited

U.S. PATENT DOCUMENTS

| | | | |
|---|---|---|---|
| 9,248,650 B2 * | 2/2016 | Muraoka | ................ B41J 2/1433 |
| 2016/0346967 A1 | 12/2016 | Oikawa et al. | |
| 2016/0346968 A1 | 12/2016 | Kimura et al. | |
| 2016/0346969 A1 | 12/2016 | Toda et al. | |

(Continued)

FOREIGN PATENT DOCUMENTS

JP    2002-178538 A    6/2002

OTHER PUBLICATIONS

Iijima et al., U.S. Appl. No. 15/631,120, filed Jun. 23, 2017.

(Continued)

*Primary Examiner* — Matthew Luu
*Assistant Examiner* — Tracey M McMillion
(74) *Attorney, Agent, or Firm* — Venable LLP

(57) ABSTRACT

A method of manufacturing a liquid ejecting method includes: a first step of injection molding passage members collectively constituting a passage for a liquid in the liquid ejecting head; a second step of moving the passage members to bring the passage members into contact with each other; and a third step of injecting a sealing material into a space between the passage members held in contact with each other, and filling the space with the sealing material. The sealing material is injected and filled, from a gate on a longitudinal side of the passage members, in a direction intersecting with a longitudinal direction of the passage members.

5 Claims, 17 Drawing Sheets

(56) References Cited

U.S. PATENT DOCUMENTS

2016/0346970 A1 12/2016 Oikawa et al.
2016/0346971 A1 12/2016 Iwano et al.
2016/0346976 A1 12/2016 Tsujiuchi et al.
2016/0347072 A1 12/2016 Iwano et al.

OTHER PUBLICATIONS

Oikawa et al., U.S. Appl. No. 15/628,934, filed Jun. 21, 2017.
Toda et al., U.S. Appl. No. 15/628,947, filed Jun. 21, 2017.
Tsujiuchi et al., U.S. Appl. No. 15/649,482, filed Jul. 13, 2017.
Tsujiuchi et al., U.S. Appl. No. 15/649,472, filed Jul. 13, 2017.
Kondo et al., U.S. Appl. No. 15/806,700, filed Nov. 8, 2017.
Nagai et al., U.S. Appl. No. 15/794,232, filed Oct. 26, 2017.

* cited by examiner

METHOD OF MANUFACTURING LIQUID EJECTING HEAD, AND LIQUID EJECTING HEAD

BACKGROUND OF THE INVENTION

Field of the Invention

The present invention relates to a method of manufacturing a liquid ejecting head and to a liquid ejecting head, or more specifically, to a technique for injection molding using a mold to bond two components to each other by feeding a molten agent between the two components.

Description of the Related Art

As a technique of this type, Japanese Patent Laid-Open No. 2002-178538 describes a technique to manufacture an ink control unit, which reserves an ink to be supplied to a printing head of an inkjet printer and controls an amount of supply, by conducting die slide injection molding.

Specifically, two components of the control unit molded by primary molding are brought into contact with each other by means of die sliding, then secondary molding is conducted in such a way as to bond the two components to each other by feeding a molten agent between the components, and a product is manufactured in which the two components are integrated together.

However, in the secondary molding in Japanese Patent Laid-Open No. 2002-178538, an injecting portion for injecting the molten agent is located at one end of the contact portion between the components. When the contact portion is a long portion extending from the injecting portion at the one end, the secondary molding has a difficulty in spreading the molten agent throughout the contact portion. As a consequence, the molten agent may fail to reach a final end portion of an injection passage and cause a bonding failure, for example. In addition, when the molten agent in the secondary molding is fed in a longitudinal direction from the injecting portion at the one end, a significant temperature gradient may develop due to a long distance between a portion near the injecting portion and the final end portion of the injection passage. In this case, there is a risk of an increase in warpage of a component during molding shrinkage.

SUMMARY OF THE INVENTION

The present invention provides a method of manufacturing a liquid ejecting head which enables a molten agent for secondary molding to spread throughout a contact portion between elongated members to be bonded by the secondary molding, and also provides a liquid ejecting head manufactured in accordance with this method.

In the first aspect of the present invention, there is provided a method of manufacturing a liquid ejecting head, comprising:
a first step of injection molding a plurality of passage members that collectively constitute a passage for a liquid in the liquid ejecting head;
a second step of moving the passage members to bring the passage members into contact with each other; and
a third step of bonding the passage members to each other by injecting a sealing material into a space between the passage members held in contact with each other, wherein the sealing material is injected from a gate provided on one longitudinal side of the passage members and is injected in a direction intersecting with a longitudinal direction of the passage members.

In the second aspect of the present invention, there is provided a liquid ejecting head comprising:
a passage member being a stacked body that constitutes a passage for a liquid in the liquid ejecting head;
a gate provided on a longitudinal side of the passage member, and
a filled region to be filled with a resin, the filled region including
a first portion extending along the passage, and
a second portion communicating with the first portion and extending from the gate in a direction intersecting with the longitudinal direction.

In the third aspect of the present invention, there is provided a method of manufacturing a liquid ejecting head provided with a first passage member and a second passage member that collectively constitute a passage for a liquid, comprising:
a first step of injection molding the first passage member and the second passage member;
a second step of bringing the first passage member and the second passage member facing each other; and
a third step of bonding the first passage member to the second passage member by injecting a filler into a region between the first passage member and the second passage member which face each other and filling at least part of the region with the filler, wherein
in the third step, the filler is injected into the region from a plurality of gates provided on a longitudinal side of at least one of the first passage member and the second passage member.

In the fourth aspect of the present invention, there is provided a liquid ejecting head comprising:
a first passage member and a second passage member that collectively constitute a passage for a liquid, wherein
a plurality of gates are provided on a longitudinal side of at least one of the first passage member and the second passage member, and
a region extending from the gates and being filled with a filler is provided between the first passage member and the second passage member.

According to the present invention, when elongated members are bonded by secondary molding in manufacturing a liquid ejecting head, it is possible to allow a molten agent for the secondary molding to spread throughout a portion in the vicinity of a contact portion.

Further features of the present invention will become apparent from the following description of exemplary embodiments with reference to the attached drawings.

DESCRIPTION OF THE EMBODIMENTS

An embodiment of the present invention will be described below in detail with reference to the accompanying drawings.

It is to be noted that the following description is not intended to limit the scope of the present invention. For example, this embodiment adopts a thermal type to eject a liquid by generating bubbles with thermoelectric conversion elements. However, the present invention is also applicable to liquid ejecting heads adopting a piezoelectric type and various other liquid ejection types. Moreover, the following embodiment describes an inkjet printing apparatus (a printing apparatus) with a configuration to circulate a liquid such as an ink between a tank and a liquid ejecting head. However, other configurations are also acceptable. For instance, an inkjet printing apparatus may be provided with two tanks on an upstream side and a downstream side of a liquid ejecting head, and configured to create a flow of an ink in a pressure chamber by feeding the ink from one of the tanks to the other tank. Furthermore, the following embodiment describes a so-called line-type head which has a length corresponding to a width of a printing medium. However, the present invention is also applicable to a liquid ejecting head of so-called a serial type which is configured to perform printing while scanning a printing medium. A typical example of the serial-type liquid ejecting head is configured to load one printing element board for a black ink and another printing element board for color inks. However, the present invention is not limited only to this configuration. For example, a liquid ejecting head may include a short line head being shorter than a width of a printing medium and being provided with several printing element boards arranged such that ejecting ports therein overlap one another in a direction of an array of the ejecting ports, and this liquid ejecting head may be configured to scan the printing medium.

(Inkjet Printing Apparatus)

Figure 1:
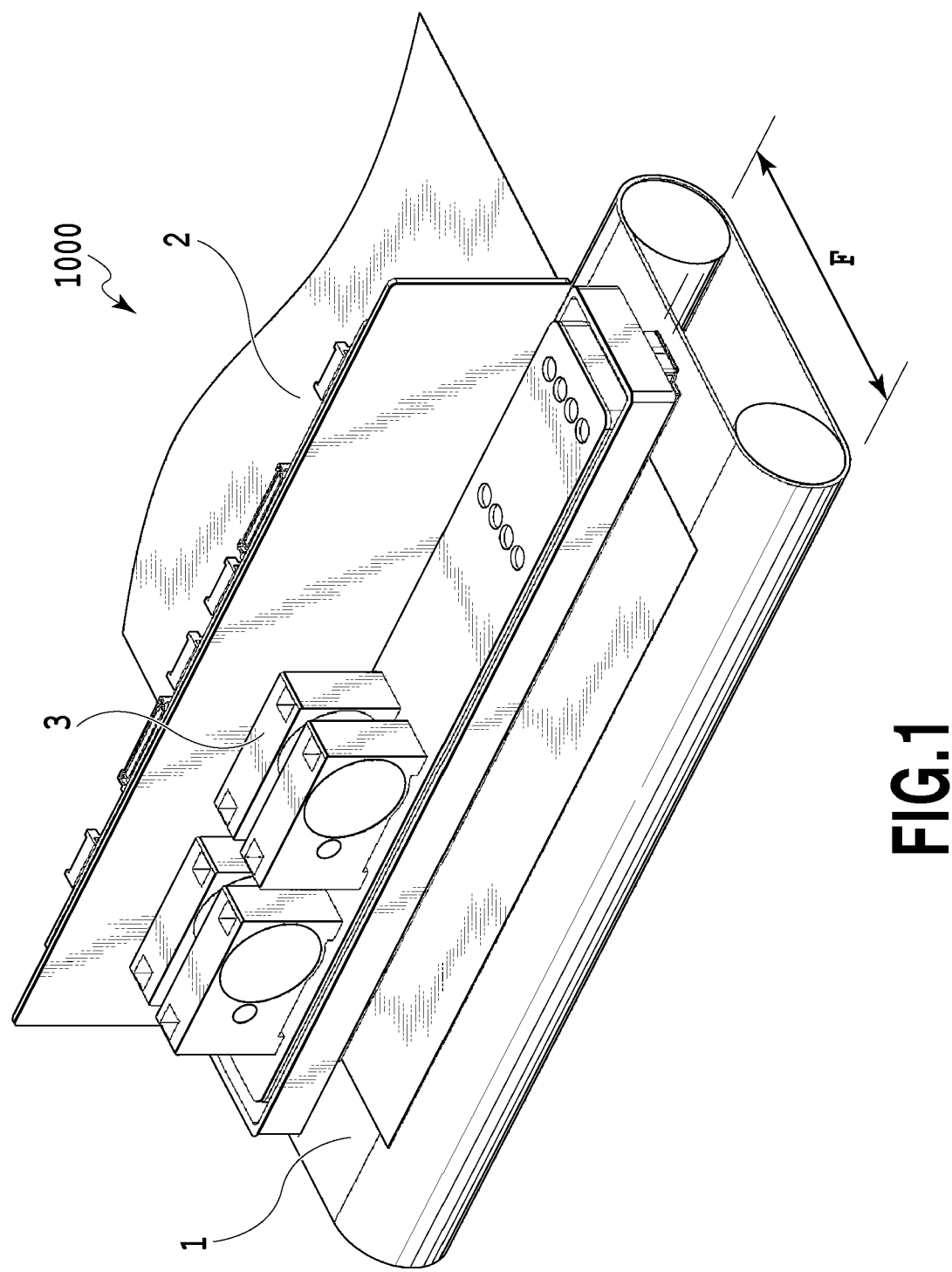
FIG. 1 is a perspective view of an inkjet printing apparatus according to an embodiment of the present invention.

FIG. 1 is a perspective view showing a schematic configuration of an apparatus to eject a liquid according to an embodiment of the present invention, or more specifically, an inkjet printing apparatus 1000 (hereinafter also referred to as the printing apparatus) that performs printing by ejecting inks. The printing apparatus 1000 includes a conveyance unit 1 which conveys a printing medium 2, and a liquid ejecting head 3 of a line type disposed substantially orthogonal to the conveyance direction of the printing medium. The printing apparatus 1000 is a line-type printing apparatus which performs continuous printing in one pass while conveying multiple printing media 2 either continuously or intermittently. The printing media 2 are not limited only to cut sheets but may also be continuous rolled sheets. The liquid ejecting head 3 can eject respective inks of cyan (C), magenta (M), yellow (Y), and black (K). As described later, liquid supply passages serving as supply paths to supply liquids to the liquid ejecting head, main tanks, and buffer tanks (see FIG. 2) are fluidically connected to the liquid ejecting head 3. Moreover, an electric control unit for supplying electric power and ejection control signals to the liquid ejecting head 3 is electrically connected to the liquid ejecting head 3. A liquid pathway and an electric signal pathway in the liquid ejecting head 3 will be described later.

(Ink Circulation Passage)

Figure 2:
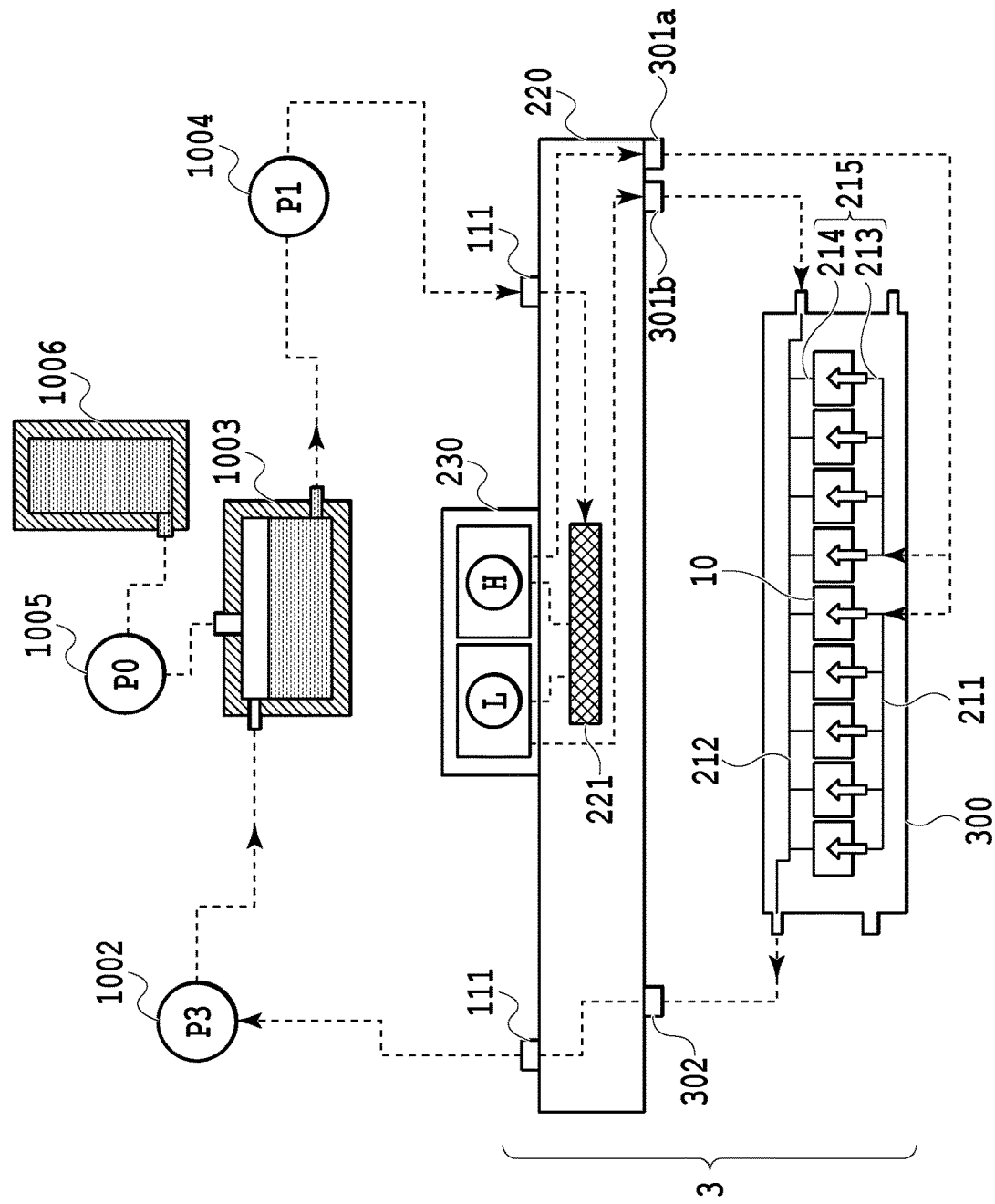
FIG. 2 is a schematic diagram showing a circulation passage of an ink in the printing apparatus of FIG. 1.

FIG. 2 is a schematic diagram showing a circulation passage of an ink in the printing apparatus illustrated in FIG. 1. In the circulation passage, the liquid ejecting head 3 is fluidically connected to a first circulation pump 1002, a buffer tank 1003, and so forth. In order to simplify the explanation, FIG. 2 illustrates only a circulation passage for one of the inks of C, M, Y, and K. In fact, the ink circulation passages for the four colors are provided in the liquid ejection head 3 and in a body of the printing apparatus. The buffer tank 1003 connected to a main tank 1006 and serving as a subtank includes an atmosphere communication port (not shown) which establishes communication between the inside and outside of the tank, so as to discharge bubbles in the inks to the outside. The buffer tank 1003 is also connected to a replenishing pump 1005. When the liquid in the liquid ejecting head 3 is consumed as a consequence of ejection (discharge) of the ink from ejecting ports of the liquid ejecting head by printing, recovery processing, and the like that involve the ink ejection, the replenishing pump 1005 transfers the ink in an amount equivalent to that consumed therein from the main tank 1006 to the buffer tank 1003.

The first circulation pump 1002 has functions to draw out the liquid from a liquid connector 111 of the liquid ejecting head 3 and to feed the liquid to the buffer tank 1003. A positive displacement pump having a quantitative liquid pumping capacity is suitable for the first circulation pump 1002. Specific examples of such a positive displacement pump include a tube pump, a gear pump, a diaphragm pump, a syringe pump, and the like. Alternatively, the first circulation pump 1002 may be configured to secure a constant flow rate by disposing a general constant flow rate valve or a general relief valve at an outlet of the pump. When the ejection takes place by driving a liquid ejecting unit 300, a certain amount of the ink is made to flow in a common collection passage 212 by using the first circulation pump 1002. This flow rate is preferably set to such an extent that a difference in temperature between the printing element boards 10 in the liquid ejecting head 3 does not affect printing image quality. Nevertheless, if the flow rate is set too large, a difference in negative pressure between the printing element boards 10 may grow too large due to an effect of a pressure loss in the passage inside the liquid ejecting unit 300, and unevenness of density is likely to occur in an image. Accordingly, it is preferable to set the appropriate flow rate while taking into account the difference in temperature and the difference in negative pressure between the printing element boards 10.

A negative pressure control unit 230 is provided in the middle of a route between a second circulation pump 1004 and the liquid ejecting unit 300, and has a function to maintain a pressure on a downstream side (that is, the liquid ejecting unit 300 side) of the negative pressure control unit 230 at a preset constant pressure even if a flow rate in the circulation system fluctuates due to a difference in duty in printing data when the printing takes place. Two pressure regulating mechanisms constituting the negative pressure control unit 230 may adopt any mechanisms as long as such a mechanism can control a pressure downstream thereof to a variation within a certain range centered on a desired setting pressure. For example, each pressure regulating mechanism may adopt a mechanism similar to a so-called "pressure reducing regulator". When the pressure reducing regulators are used, it is preferable to apply a pressure to the upstream side of the negative pressure control unit 230 through a liquid supply unit 220 by using the second circulation pump 1004 as shown in FIG. 2. In this way, it is possible to suppress an effect of a water head pressure from the buffer tank 1003 to the liquid ejecting head 3, and thus to increase the freedom of layout of the buffer tank 1003 in the printing apparatus 1000. The second circulation pump 1004 only needs to have a lifting pressure that is equal to or above a certain pressure in a range of an ink circulation flow rate used during the drive of the liquid ejecting head 3, so that any one of a turbo pump, a positive displacement pump, and the like is applicable. Specifically, a diaphragm pump and the like are applicable. Alternatively, instead of the second circulation pump 1004, it is possible to apply a water head tank disposed in such a way as to establish a certain water head difference with respect to the negative pressure control unit 230, for example.

As shown in FIG. 2, the negative pressure control unit 230 includes the two pressure regulating mechanisms set to such control pressures that are different from each other. Of the two negative pressure regulating mechanisms, one with a relatively high setting pressure (indicated with "H" in FIG. 2) and one with a relatively low setting pressure (indicated with "L" in FIG. 2) are connected to a common supply passage 211 and a common collection passage 212, respectively, in the liquid ejecting unit 300 through the liquid supply unit 220. The ink flowing out of a pressure regulating mechanism H is supplied to the liquid ejecting unit 300 in the liquid ejecting head 3 through an inflow port 301a, and the ink flowing out of a pressure regulating mechanism unit L is supplied to the liquid ejecting unit 300 through an inflow port 301b, respectively. The liquid ejecting unit 300 is provided with the common supply passage 211, the common collection passage 212, and individual supply passages 215 (individual supply passages 213 and individual collection passages 214) communicating with the respective printing element boards. Since the individual supply passages 215 communicate with the common supply passage 211 and the common collection passage 212, part of the liquid fed from the first circulation pump 1002 is passed from the common supply passage 211 through internal passages of the printing element boards 10, and flows to the common collection passage 212 (a direction indicated with arrows in FIG. 2). This flow occurs because there is a difference in pressure between the pressure regulating mechanism H connected to the common supply passage 211 and the pressure regulating mechanism L connected to the common collection passage 212, and the first circulation pump 1002 is connected only to the common collection passage 212.

As described above, the flow of the liquid which is passed through the common collection passage 212 and the flow of the liquid which is passed from the common supply passage 211 through the respective printing element boards 10 and further to the common collection passage 212 occur in the liquid ejecting unit 300. Accordingly, it is possible to discharge heat generated in each printing element board 10 to the outside of the printing element board 10 by use of the flow from the common supply passage 211 to the common collection passage 212. Moreover, this configuration makes it possible to create the flow of the ink in an ejecting port and a pressure chamber which are not involved in the printing when the liquid ejecting head 3 is performing the printing. Thus, it is possible to suppress thickening of the ink in that region. In addition, a thickened ink or a foreign matter in the ink can be discharged to the common collection passage 212. As a consequence, the liquid ejecting head 3 of this embodiment can print high-quality images at a high speed.

(Configuration of Liquid Ejecting Head)

Figure 3A:
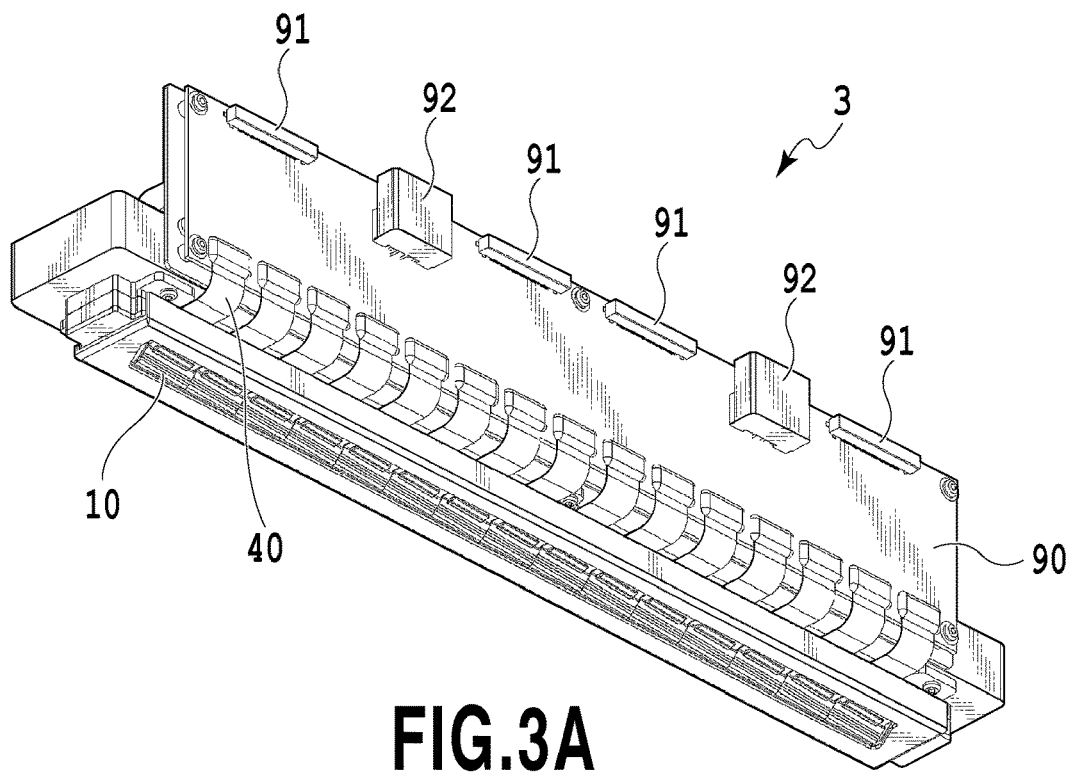
FIGS. 3A and 3B are perspective views showing a liquid ejecting head 3 according to the embodiment of the present invention, respectively.
Figure 3B:
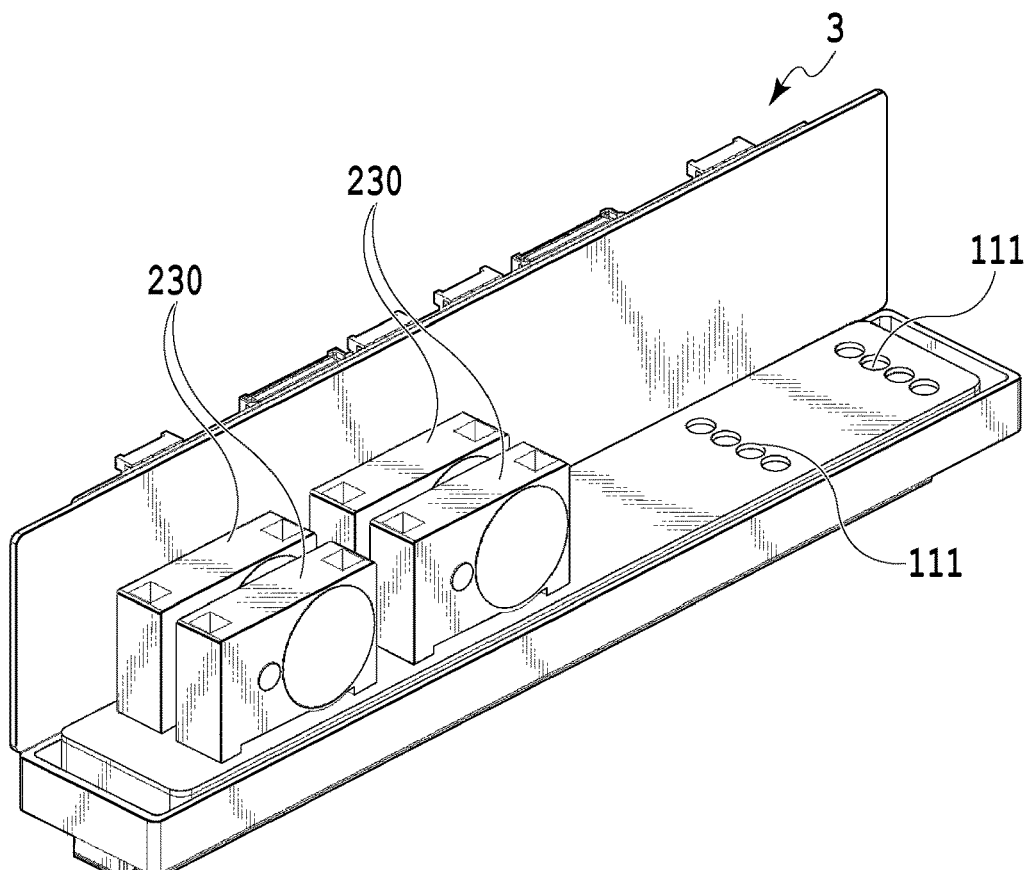

FIGS. 3A and 3B are perspective views showing the liquid ejecting head 3 of this embodiment. A configuration of the liquid ejecting head 3 according to a first embodiment will now be described. The liquid ejecting head 3 is a liquid ejecting head of a line type in which fifteen printing element boards 10 are arranged in alignment (disposed in line). Here, each printing element board 10 is capable of ejecting the inks of four colors of C, M, Y, and K. As shown in FIG. 3A, the liquid ejecting head 3 includes signal input terminals 91 and power supply terminals 92, which are electrically connected to the respective printing element boards 10 through flexible wiring substrates 40 and an electric wiring board 90. The signal input terminals 91 and the power supply terminals 92 are electrically connected to a control unit of the printing apparatus 1000, and are configured to supply ejection drive signals and electric power necessary for ejection, respectively, to the printing element boards 10. The wiring is consolidated by an electric circuit in the electric wiring board 90. Thus, the numbers of the signal input terminals 91 and the power supply terminals 92 can be made fewer than the number of the printing element boards 10. For this reason, it is possible to reduce the number of electric connectors to be connected when installing the liquid ejecting head 3 in the printing apparatus 1000 and to be disconnected when replacing the liquid ejecting head 3. As shown in FIG. 3B, liquid connectors 111 provided on one side of the liquid ejecting head 3 are connected to liquid supply systems in the printing apparatus 1000. Thus, the inks of four colors of C, M, Y, and K are supplied from the supply systems in the printing apparatus 1000 to the liquid ejecting head 3, and the inks having passed through the liquid ejecting head 3 are collected by the supply systems in the printing apparatus 1000. As described above, the inks of the respective colors can be circulated through the passages in the printing apparatus 1000 and the passages in the liquid ejecting head 3.

Figure 4:
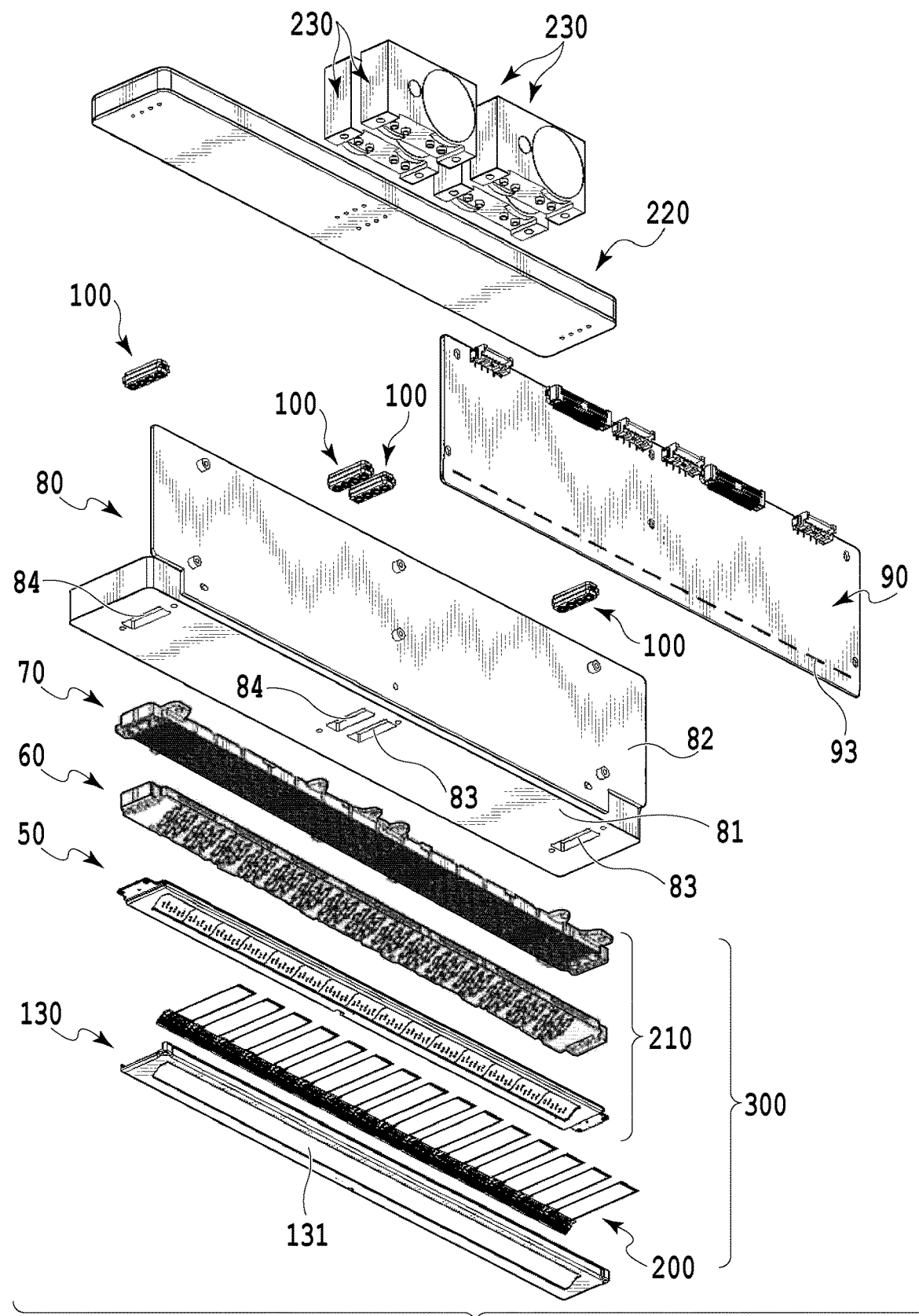
FIG. 4 is an exploded perspective view of the liquid ejecting head according to the embodiment of the present invention.

FIG. 4 is an exploded perspective view showing components or units constituting the liquid ejecting head 3 of this embodiment. The liquid ejecting unit 300, the liquid supply unit 220, and the electric wiring board 90 are attached to a housing 80. The liquid supply unit 220 is provided with the liquid connectors 111 (FIGS. 2, 3A, and 3B). Moreover, filters 221 (FIG. 2) for the respective colors communicating with openings of the liquid connectors 111 are provided inside the liquid supply unit 220 in order to remove foreign matters in the supplied inks. The liquid supply unit 220 is provided with the filters 221 for the four colors. The liquids having passed through the filters 221 are supplied to the negative pressure control units 230 that are disposed on the supply unit 220 so as to correspond to the respective ink colors. Each negative pressure control unit 230 is a unit including pressure regulating valves for each ink color, and is capable of significantly attenuating a change in pressure loss inside the corresponding supply system (the system on the upstream of the liquid ejecting head 3) in the printing apparatus 1000 caused by a change in flow rate of the liquid by use of actions of valves, spring members, and the like provided inside the negative pressure control unit 230, thus stabilizing the change in negative pressure on the downstream side (the liquid ejecting unit 300 side) of the negative pressure control unit 230 within a certain range. As described previously with reference to FIG. 2, the two pressure regulating valves for each color are embedded in the negative pressure control unit 230 for that color. The pressure regulating valves are set to control pressures different from each other. The pressure regulating valve on the high pressure side is connected to the common supply passage 211 in the liquid ejecting unit 300 through the liquid supply unit 220 while the pressure generating valve on the low pressure side is connected to the common collection passage 212 through the liquid supply unit 220.

The housing 80 includes a liquid ejecting unit support 81 and an electric wiring board support 82 so as to support the liquid ejecting unit 300 and the electric wiring board 90 and to ensure rigidity of the liquid ejecting head 3. The electric wiring board support 82 is designed to support the electric wiring board 90, and is fixed with screws to the liquid ejecting unit support 81. Openings 83 and 84 to allow insertion of rubber joints 100 are provided in the liquid ejecting unit support 81. The liquids supplied from the liquid supply unit 220 are introduced through the rubber joints to a third passage submember 70 that constitutes the liquid ejecting unit 300.

The liquid ejecting unit 300 includes multiple ejecting modules 200 and a passage member 210. A cover member 130 is attached to a surface on the printing medium side of the liquid ejecting unit 300. Here, as shown in FIG. 4, the cover member 130 is member having a frame-like surface, which is provided with an elongated opening 131, and the printing element boards 10 and sealing material portions 110 (FIG. 8A) included in the ejecting modules 200 are exposed from the opening 131. The frame portion around the opening 131 also functions as a contact surface to come into contact with a cap member that caps the liquid ejecting head 3 during standby for printing. Accordingly, a closed space is defined at the time of the capping by filling irregularities and gaps on an ejecting surface of the liquid ejecting unit 300 by coating an adhesive, a sealing material, a filler, and the like along the periphery of the opening 131.

As shown in FIG. 4, the passage member 210 included in the liquid ejecting unit 300 is a stacked body formed by stacking a first passage member 50, a second passage member 60, and the third passage member 70. The passage member 210 is capable of distributing the liquids supplied from the liquid supply unit 220 to the respective ejecting modules 200 and taking the liquids returning from the ejecting modules 200 back to the liquid supply unit 220 by using passages formed by the stack. The passage member 210 is fixed with screws to the liquid ejecting unit support 81. A process to manufacture the passage member 210 will be described later with reference to the drawings starting from FIG. 12A.

Figure 5:
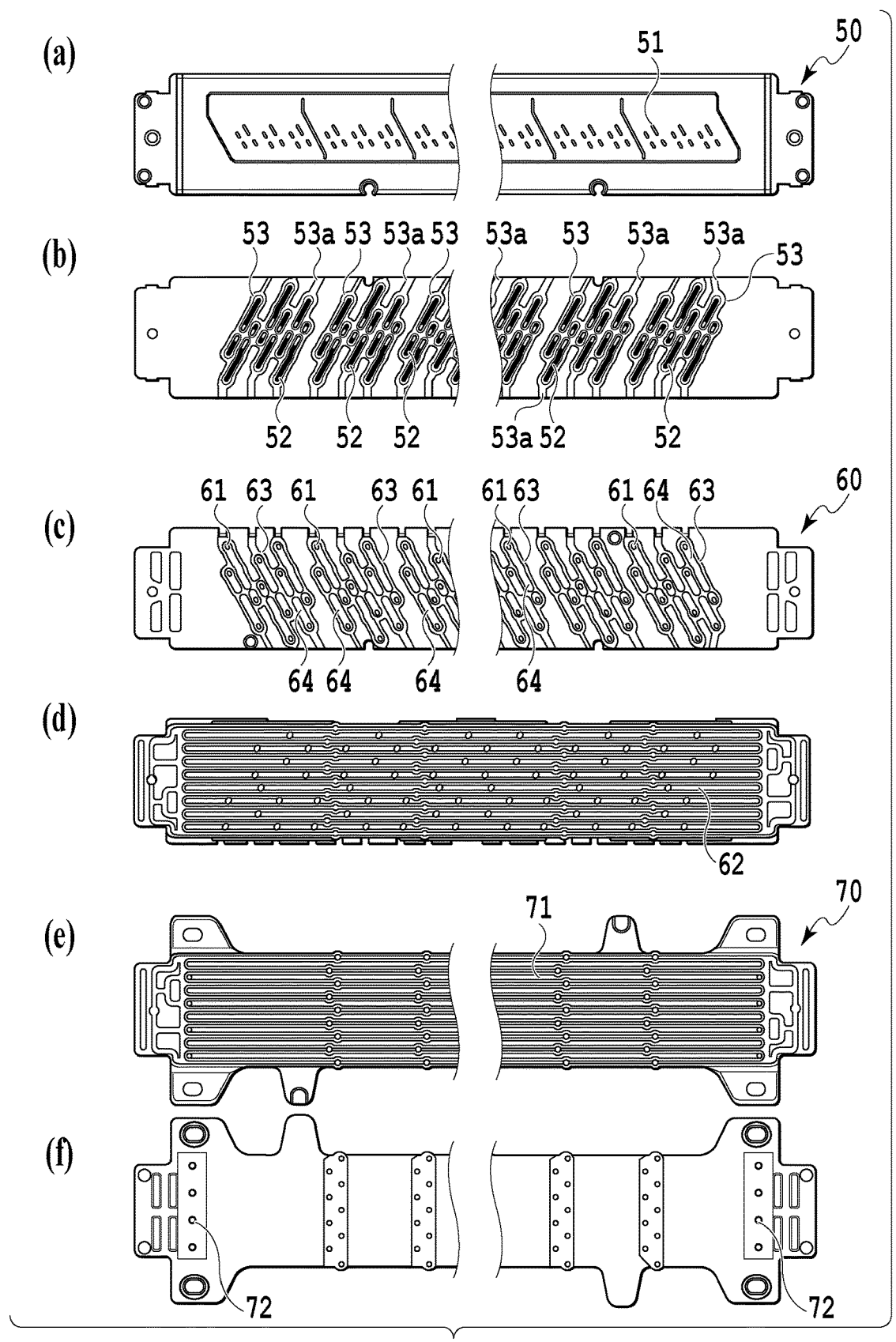
FIG. 5 shows explanatory diagrams of front surfaces and back surfaces of passage members, namely, first, second, and third passage members shown in FIG. 4.

Parts (a) to (f) of FIG. 5 are diagrams showing front and back surfaces of the first to third passage members shown in FIG. 4, respectively.

Part (a) of FIG. 5 shows a surface of the first passage member 50 to mount the ejecting modules 200, while part (f) of FIG. 5 shows a surface of the third passage member 70 to come into contact with the liquid ejecting unit support 81. The first passage member 50 and the second passage member 60 are bonded to each other such that contact surfaces of the respective passage members, namely, a surface shown in part (b) of FIG. 5 and a surface shown in part (c) of FIG. 5 are opposed to each other. Meanwhile, the second passage member 60 and the third passage member 70 are bonded to each other such that contact surfaces of the respective passage members, namely, a surface shown in part (d) of FIG. 5 and a surface shown in part (e) of FIG. 5 are opposed to each other.

Figure 7:
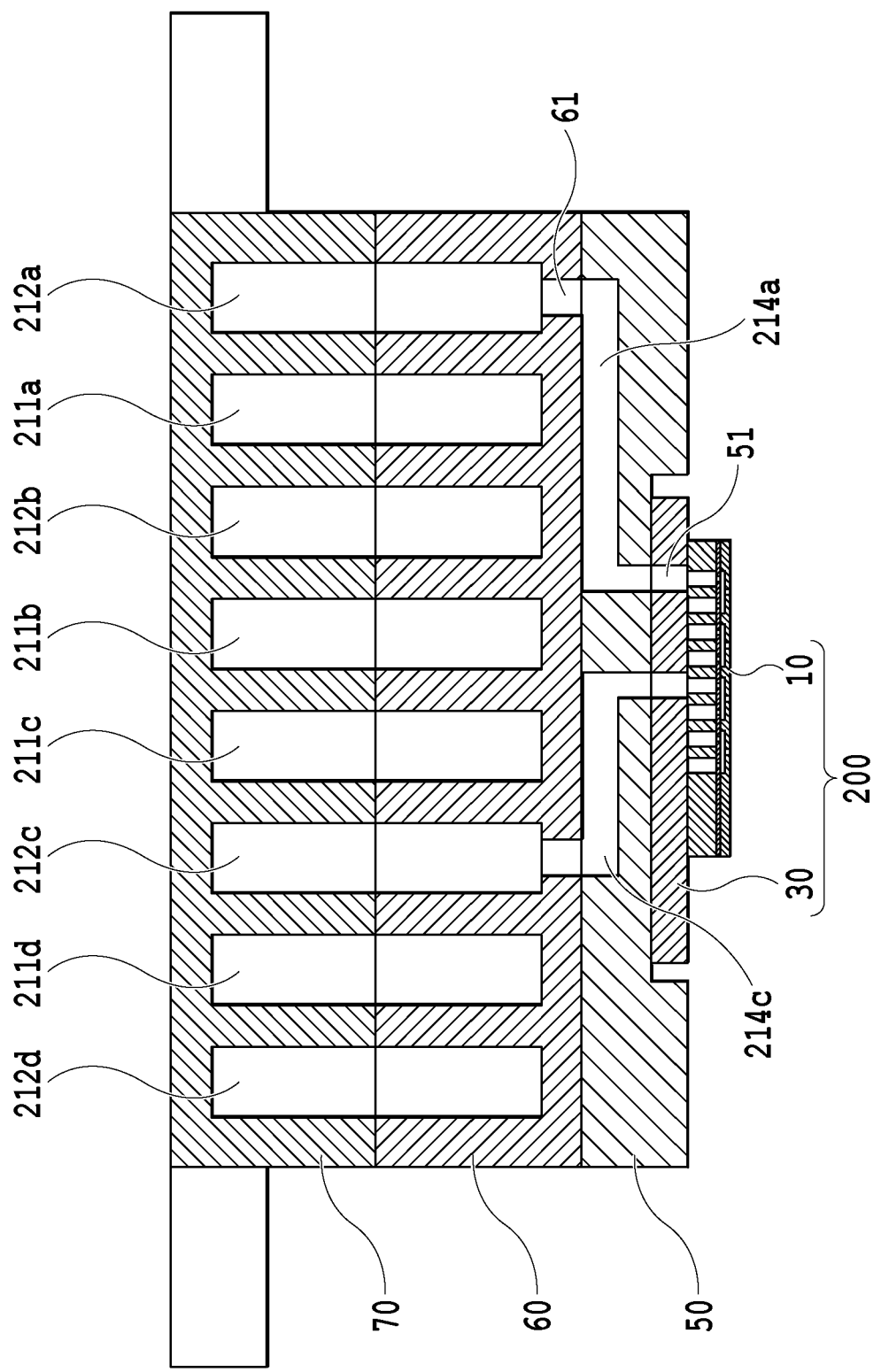
FIG. 7 is a cross-sectional view taken along the VII-VII line in FIG. 6.

As a consequence of bonding the second passage member 60 to the third passage member 70, eight common passages that extend in a longitudinal direction of the passage members are formed by common passage grooves 62 and common passage grooves 71 provided in the respective passage members. Thus, the set of the common supply passage 211 and the common collection passage 212 for each ink color is formed inside the passage member 210 (FIG. 7). Communication ports 72 in the third passage member 70 communicate with the holes of the rubber joints 100, respectively, thereby fluidically communicating with the liquid supply unit 220.

By bonding the first passage member 50 to the second passage member 60, it is possible to cause the above-mentioned eight common passages to communicate with communication ports 51 in the first passage member 50. To be more precise, multiple communication ports 61 are formed in bottom surfaces of the common passage grooves 62 in the second passage member 60, and each of the communication ports 61 communicates with one end portion of corresponding one of individual passage grooves 52 in the first passage member 50. Moreover, each of the communication ports 51 is formed at the other end portion of each individual passage groove 52 in the first passage member 50, and fluidic communication with the multiple ejecting modules 200 is established by way of the communication ports 51. The individual passage grooves 52 make it possible to consolidate the passages into a center side of the passage member.

From two end portions at a region where each individual passage groove 52 and its peripheral surface 53 extend in a direction intersecting with the above-mentioned longitudinal direction, grooves 53a each having a bottom of the same height as that of the surface 53 extend toward ends at two side portions of the first passage member 50. Here, the recessed groove having the surface 53 at the bottom is defined for the first time when the first passage member 50 is bonded to the second passage member 60, and hence does not exist before the bonding. Meanwhile, as shown in part (c) of FIG. 5, a sealing material groove 63 and a protruding portion 64 corresponding to each set of the individual passage groove 52, the surface 53, and the groove 53a mentioned above, in such a way as to surround the corresponding communication port 61 in the second passage member 60. Specifically, as described later with reference to FIG. 15, as a consequence of bonding the first passage member 50 to the second passage member 60, each individual passage is formed by tightly sealing the individual passage groove 52 in the first passage member 50 with the protruding portion 64 of the second passage member 60. Moreover, a passage for a secondary sealing material is formed around the individual passage groove 52 by use of the sealing material groove 63. The passage for the secondary sealing material is used in the manufacturing of the liquid ejecting head 3 to be described later with reference to the drawings starting from FIG. 12A.

Figure 6:
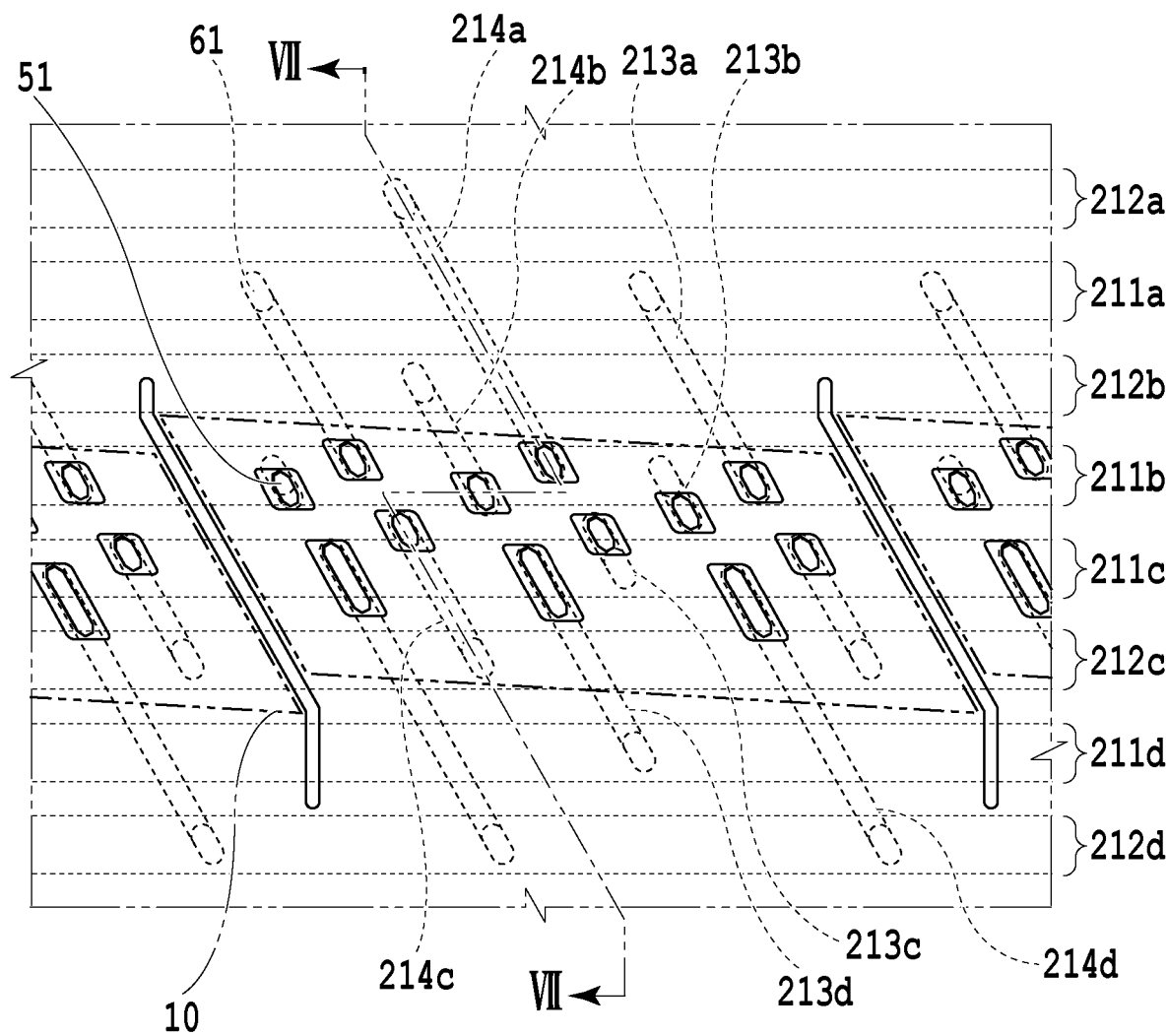
FIG. 6 is a diagram for explaining connection relations among passages in a passage member according to the embodiment of the present invention.

FIG. 6 is a diagram for explaining connection relations among the passages in the passage member 210, which is a partially enlarged transparent diagram of the passages in the passage member 210 formed by bonding the first to third passage members, which are viewed from the surface of the first passage member 50 on which the ejecting modules 200 are mounted. The passage forming member 210 includes the common supply passages 211 (211a, 211b, 211c, and 211d) and the common collection passages 212 (212a, 212b, 212c, and 212d), which are provided corresponding to the respective ink colors and extend in the longitudinal direction of the liquid ejecting head 3. The multiple individual supply passages 213 (213a, 213b, 213c, and 213d) formed of the individual passage grooves 52 are connected to the common supply passages 211 for the respective colors through the communication ports 61. Meanwhile, the multiple individual collection passages 214 (214a, 214b, 214c, and 214d) formed of the individual passage grooves 52 are connected to the common collection passages 212 for the respective ink colors through the communication ports 61. The above-described passage configuration enables consolidation of the inks from the respective common supply passages 211 to the printing element boards 10 located at a central part of the passage member through the individual supply passages 213. Moreover, it is possible to take the inks from the printing element boards 10 back to the common collection passages 212 through the individual collection passages 214.

FIG. 7 is a cross-sectional view taken along the VII-VII line in FIG. 6. As shown in FIG. 7, the respective individual collection passages (214a and 214c) communicate with the ejecting module 200 through the communication ports 51. FIG. 7 illustrates only the individual collection passages (214a and 214c). However, on a different cross section as shown in FIG. 6, the individual supply passages 213 communicate with the ejecting modules 200. A passage for supplying the ink from the first passage member 50 to printing elements 15 (FIG. 9B) provided on the printing element board 10, and a passage for taking (collecting) part or all of the liquid supplied to the printing elements 15 back to the first passage member 50 are formed in a support member 30 and in the printing element board 10 which are included in each ejecting module 200. Here, the common supply passage 211 for each ink color is connected to the negative pressure control unit 230 (the high pressure side) of the corresponding color through the liquid supply unit 220. Meanwhile, the common collection passage 212 for each ink color is connected to the negative pressure control unit 230 (the low pressure side) through the liquid supply unit 220. The difference in pressure is provided between these negative pressure control units 230 and the first circulation pump 1002 is connected solely to the common collection passage 212. As a consequence, as shown in FIGS. 6 and 7, the flow of the ink of each color is created in the liquid ejecting head of this embodiment connected to the respective passages, in such a way as to flow sequentially from the common supply passage 211 through the individual supply passage 213, the printing element board 10, the individual collection passage 214, and eventually to the common collection passage 212.

(Ejecting Module)

Figure 8A:
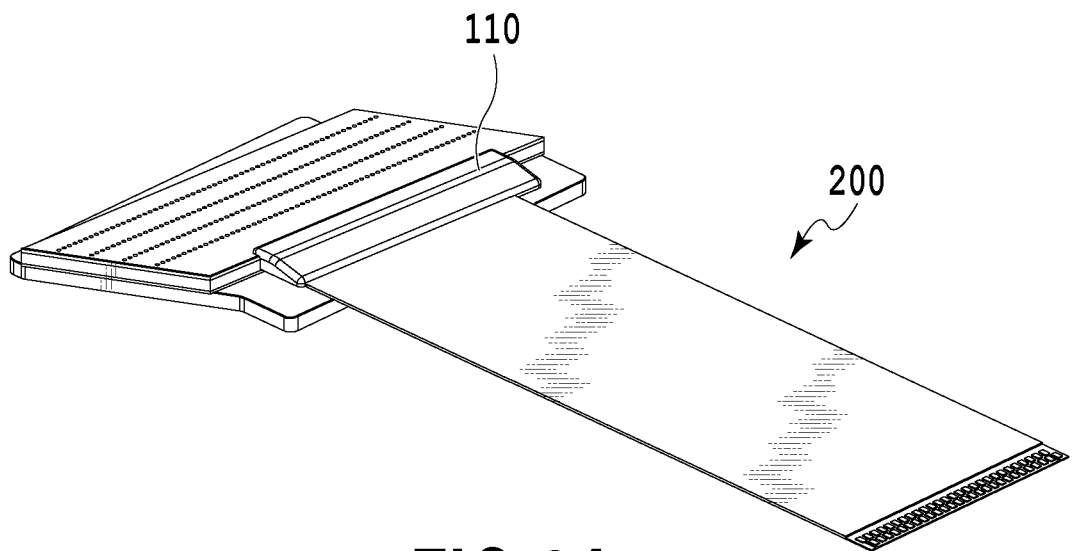
FIGS. 8A and 8B are perspective views of an ejecting module according to the embodiment of the present invention, respectively.
Figure 8B:
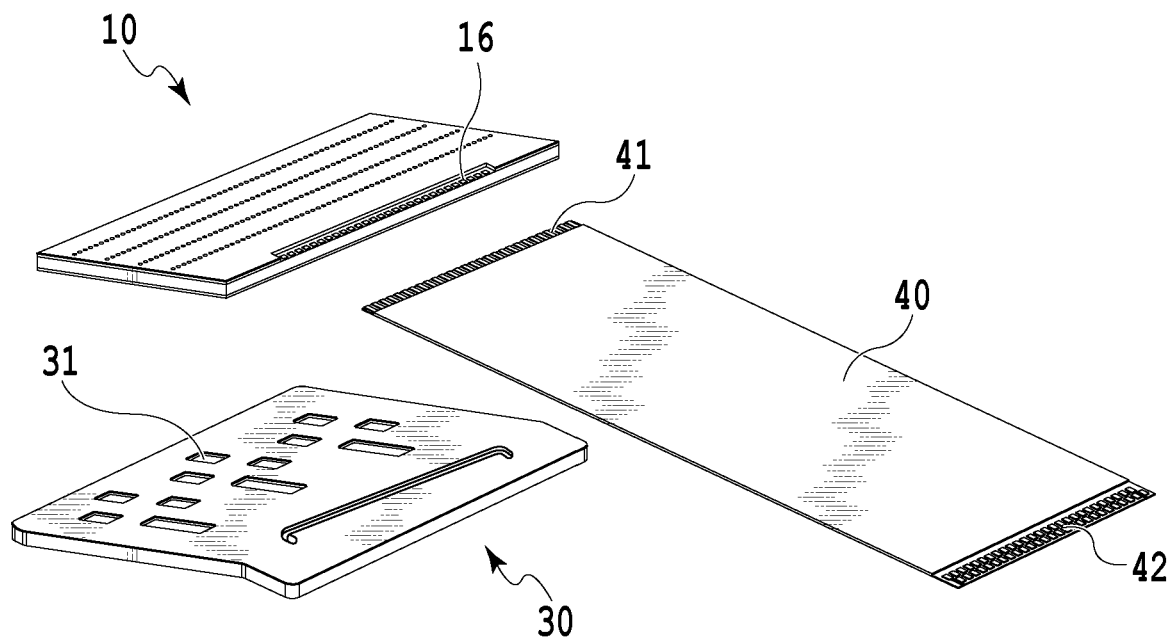

FIGS. 8A and 8B are a perspective view and an exploded perspective view, respectively, which show the ejecting module 200 of this embodiment. As for a method of manufacturing the ejecting module 200, the printing element board 10 and the flexible wiring substrate 40 are first bonded onto the support member 30 provided with liquid communication ports 31 in advance. Thereafter, a terminal 16 on the printing element board 10 is electrically connected to a terminal 41 on the flexible wiring substrate 40 by wire bonding, and then the wire bonded part (an electrically connected part) is covered and sealed with the sealing material 110. A terminal 42 of the flexible wiring substrate 40 located on the opposite side from the printing element board 10 is electrically connected to a connection terminal 93 (see FIG. 4) of the electric wiring board 90. The support member 30 is a support configured to support the printing element board 10 and is also a passage member to establish fluidic communication between the printing element board 10 and the passage member 210. For this reason, the support member 30 is preferably a member having a high degree of flatness and being the one that can be bonded to the printing element board with sufficiently high reliability. Examples of suitable materials therefor include alumina and a resin material.

(Structure of Printing Element Board)

Figure 9A:
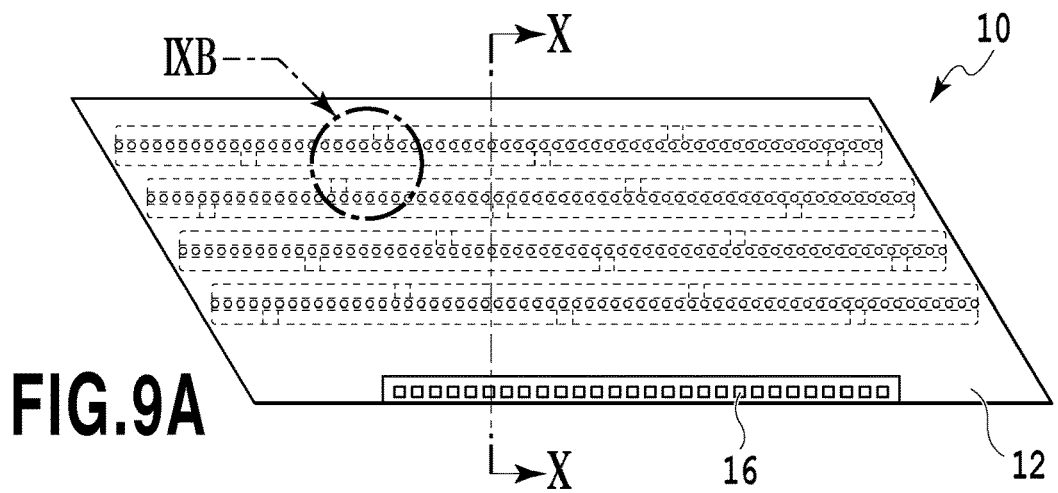
FIGS. 9A to 9C are explanatory diagrams of a printing element board according to the embodiment of the present invention, respectively.
Figure 9B:
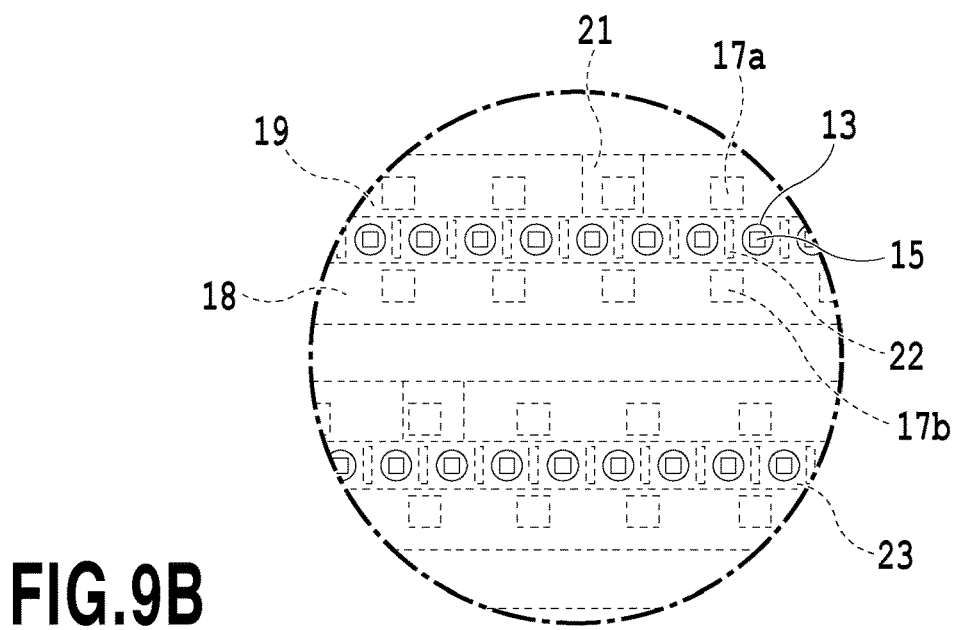
Figure 9C:
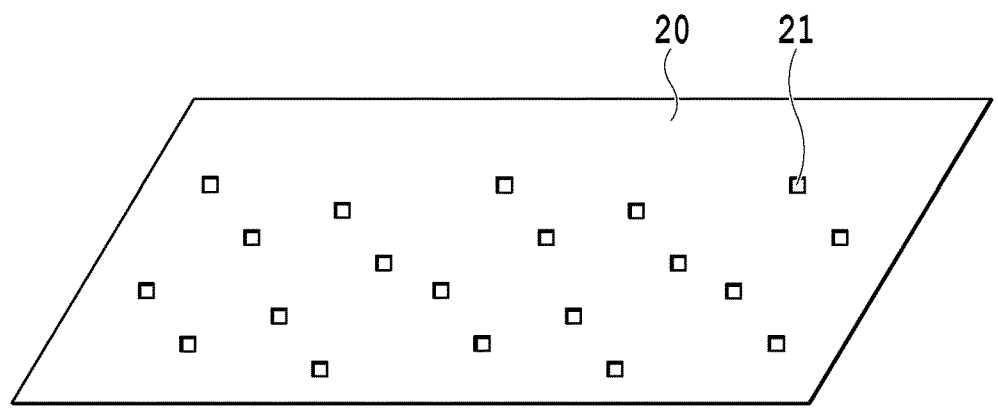

FIGS. 9A, 9B, and 9C are diagrams for explaining a configuration of the printing element board 10 of this embodiment. FIG. 9A is a plan view of a surface on one side of the printing element board 10 in which ejecting ports 13 are formed, FIG. 9B is an enlarged view of a portion indicated with reference sign IXB in FIG. 9A, and FIG. 9C is a plan view of the opposite surface from the surface in FIG. 9A. As shown in FIG. 9A, four ejecting port arrays corresponding to the respective ink colors are formed in an ejecting port forming member 12 of the printing element board 10. Note that an extending direction of the ejecting port arrays in which the multiple ejecting ports 13 are arranged will be hereinafter referred to as an "ejecting port array direction".

As shown in FIG. 9B, the printing element 15 serving as a heat generating element to create a bubble of the liquid by using heat energy is disposed at a position corresponding to each ejecting port 13. Pressure chambers 23 each including the corresponding printing element 15 are defined by use of partition walls 22. Each printing element 15 is electrically connected to the terminal 16 in FIG. 9A by electric wiring (not shown) provided to the printing element board 10. The printing element 15 brings the liquid to a boil by generating the heat based on a pulse signal inputted from a control circuit of the printing apparatus 1000 through the electric wiring board 90 (FIG. 4) and the flexible wiring substrate 40 (FIG. 8B). The liquid is ejected from the ejecting port 13 by bubbling energy generated by the boil. As shown in FIG. 9B, liquid supply passages 18 extend on one side and liquid collection passages 19 extend on the other side along the respective ejecting port arrays. The liquid supply passages 18 and the liquid collection passages 19 are passages extending in the ejecting port array direction provided in the printing element board 10, which communicate with the ejecting ports 13 through supply ports 17a and collection ports 17b, respectively.

Figure 10:
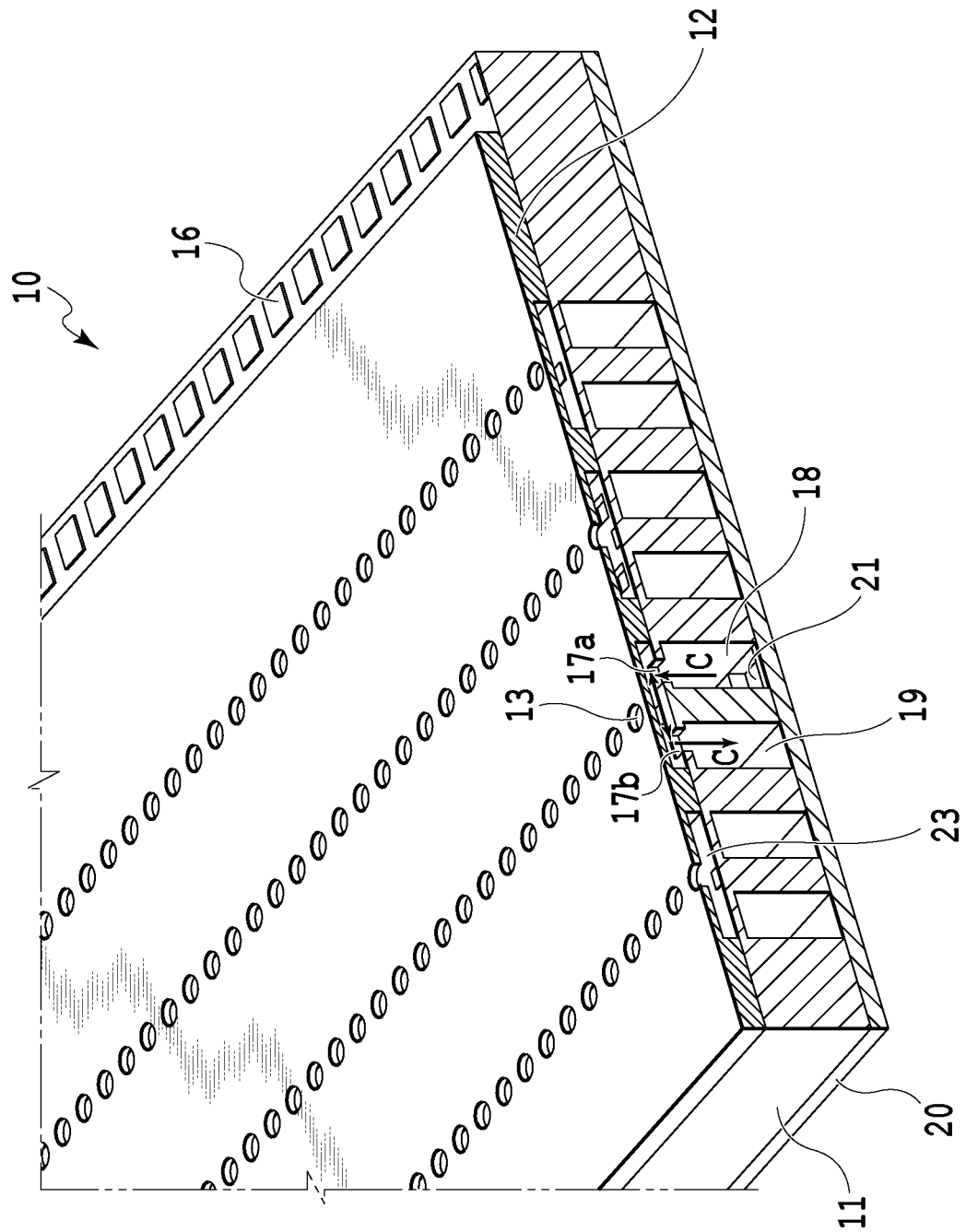
FIG. 10 is a cross-sectional view taken along the X-X line in FIG. 9A.

As shown in FIGS. 9C and 10, a sheet-like lid member 20 is stacked on the back surface of the printing element board 10 in which the ejecting ports 13 are formed. The lid member 20 is provided with multiple openings 21 that communicate with the liquid supply passages 18 and the liquid collection passages 19 to be described later. In this embodiment, each liquid supply passage 18 is provided with two openings 21 while each liquid collection passage 19 is provided with one opening 21. As shown in FIG. 9B, the respective openings 21 of the lid member 20 communicate with the multiple communication ports 51 shown in part (a) of FIG. 5. The lid member 20 has a function as a lid which constitutes part of walls of the liquid supply passages 18 and the liquid collection passages 19 formed in a substrate 11 of the printing element board 10 as shown in FIG. 10. The lid member 20 preferably has sufficient corrosion resistance against the liquids. Moreover, opening shapes and opening positions of the openings 21 are required to satisfy high accuracy from the viewpoint of preventing color mixture. For this reason, it is preferable to use a photosensitive resin material or a silicon plate as a material of the lid member 20, and to provide the openings 21 by a photolithographic process. As mentioned above, the lid member 20 is configured to change pitches of the passages by use of the openings 21. The lid member 20 preferably has a small thickness in consideration of the pressure loss, and is preferably formed from a film-like member.

FIG. 10 is a perspective view showing the printing element board 10 and the lid member 20, which are sectioned along the X-X line in FIG. 9A. The printing element board 10 is formed by stacking the substrate 11 made of Si and the ejecting port forming member 12 made of a photosensitive resin, and the lid member 20 is bonded to a back surface of the substrate 11. The printing elements 15 are formed on one surface side of the substrate 11 (FIG. 9B), while grooves constituting the liquid supply passages 18 and the liquid collection passages 19 extending along the ejecting port arrays are formed in the other surface side thereof. The liquid supply passages 18 and the liquid collection passages 19 formed by the substrate 11 and the lid member 20 are connected to the common supply passage 211 and the common collection passage 212 in the passage member 210, respectively. As a consequence, it is possible to create a difference in pressure between each liquid supply passage 18 and the corresponding liquid collection passage 19. While the printing is performed by ejecting the liquids from the multiple ejecting ports 13 of the liquid ejecting head 3, the liquid in the liquid supply passage 18 provided in the substrate 11 flows in each ejecting port, which is not performing an ejecting operation, to the liquid collection passage 19 through the supply port 17a, the pressure chamber 23, and the collection port 17b (a flow indicated with arrows C in FIG. 10) by use of the difference in pressure. This flow makes it possible to take a thickened ink caused by evaporation from the ejecting port 13 as well as bubbles, foreign matters, and so forth, which are located in the ejecting port 13 and the pressure chamber 23 suspending the ink ejection, back to the liquid collection passage 19. Moreover, it is also possible to suppress thickening of the ink in the ejecting port 13 and the pressure chamber 23. The liquid taken back to the liquid collection passage 19 is passed through the opening 21 of the lid member 20 and the liquid communication port 31 (see FIG. 8B) of the support member 30, and taken back in the order of the communication port 51, the individual collection passage 214, and the common collection passage 212 in the passage member 210. The liquid is eventually taken back to the supply passage of the printing apparatus 1000.

In other words, the liquid supplied from the body of the printing apparatus to the liquid ejecting head 3 is supplied and collected while flowing in the following order. Specifically, the liquid first flows into the liquid ejecting head 3 from the liquid connector 111 of the liquid supply unit 220. The liquid is then supplied sequentially in the order of the rubber joint 100, the communication port 72 and the common passage groove 71 provided to the third passage member, the common passage groove 62 and the communication port 61 provided to the second passage member, and the individual passage groove 52 and the communication port 51 provided to the first passage member. Thereafter, the liquid is sequentially passed through the liquid communication port 31 provided to the support member 30, the opening 21 provided to the lid member, and the liquid supply passage 18 and the supply port 17a provided to the substrate 11, and is supplied to the pressure chamber 23. Of the liquid supplied to the pressure chamber 23, a portion of the liquid not ejected from the ejecting port 13 flows sequentially through the collection port 17b and the liquid collection passage 19 provided to the substrate 11, the opening 21 provided to of the lid member, and the liquid communication port 31 provided to the support member 30. Thereafter, the liquid flows sequentially through the communication port 51 and the individual passage groove 52 provided to the first passage member, the communication port 61 and the common passage groove 62 provided to the second passage member, the common passage groove 71 and the communication port 72 provided to the third passage member 70, and the rubber joint 100. Thus, the liquid flows out of the liquid ejecting head 3 through the liquid connector 111 provided to the liquid supply unit. In the aspect of the circulation passage shown in FIG. 2, the liquid flowing in from the liquid connector 111 is passed through the negative pressure control unit 230, then through the rubber joint 100, and flows from the liquid connector 111 to the outside of the liquid ejecting head through the negative pressure control unit 230.

In the meantime, as shown in FIG. 2, all the liquid having flowed from the one end of the common supply passage 211 in the liquid ejecting unit 300 is not always supplied to the pressure chamber 23 through the individual supply passage 213, but there is also a portion of the liquid that flows from the other end of the common supply passage 211 to the liquid supply unit 220. As described above, by providing the passage that allows the liquid to flow without being passed through the printing element board 10, it is possible to suppress a back flow of a circulation flow of the liquid even in the case of providing the printing element board 10 that includes the relatively fine passages which have large flow resistance as in this embodiment. In this way, the liquid ejecting head of this embodiment can suppress the thickening of the liquid in the pressure chamber and in the vicinity of the ejecting port. Thus, it is possible to suppress misdirection of ejection and ejection failures, and to perform high-quality printing as a consequence.

(Positional Relation Between Printing Element Boards)

Figure 11:
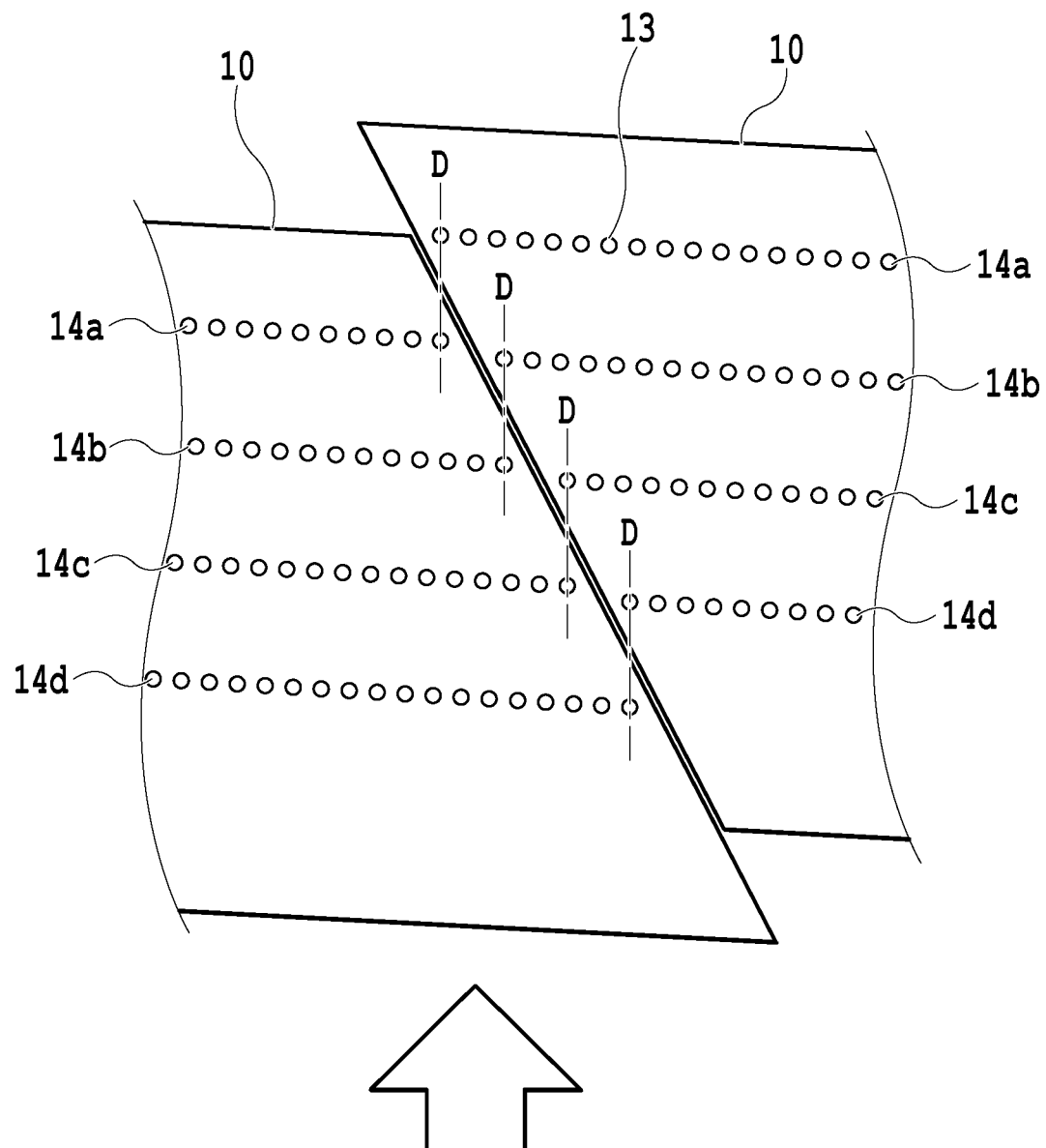
FIG. 11 is a plan view of abutting portions of the printing element boards according to the embodiment of the present invention.

FIG. 11 is a partially enlarged plan view showing abutting portions of the printing element boards 10 that belong, respectively, to two ejecting modules of this embodiment that abut on each other. As shown in FIG. 9A, each printing element board 10 of this embodiment has a substantially parallelogram shape. As shown in FIG. 11, the ejecting port arrays (14a to 14d) in which the ejecting ports 13 of the respective printing element boards 10 are arranged are laid out in such a way as to be inclined by a prescribed angle with respect to the conveyance direction of the printing medium. Thus, regarding the ejecting port arrays at the abutting portions of a pair of the printing element boards 10, at least one ejecting port of one of the ejecting port arrays overlaps one ejecting port of the other ejecting port array in the conveyance direction of the printing medium. As shown in FIG. 11, two ejecting ports on a line D overlap each other. According to the above-described layout, even if the positions of the printing element boards 10 are slightly misaligned with respect to prescribed positions, it is possible to obscure streaks, voids, and the like on a printed image by controlling the drive of the ejecting ports that overlap one another. Even when the multiple printing element boards 10 are arranged in alignment (disposed in line) instead of a so-called staggered alignment, the configuration as shown in FIG. 11 can take measures against streaks and voids at a junction of the printing element boards 10 while controlling an increase in length of the liquid ejecting head 3 in the conveyance direction of the printing medium. Here, a principal plane of each printing element board has a parallelogram shape in this embodiment. However, the present invention is not limited only to this configuration, and the structure of the present invention is suitably applicable to a case of using printing element boards each having a rectangular shape, a trapezoidal shape, and any other shapes, for example.

Next, a description will be given of a process to manufacture the passage member 210 of the liquid ejecting unit in the configuration explained above.

Figure 12A:
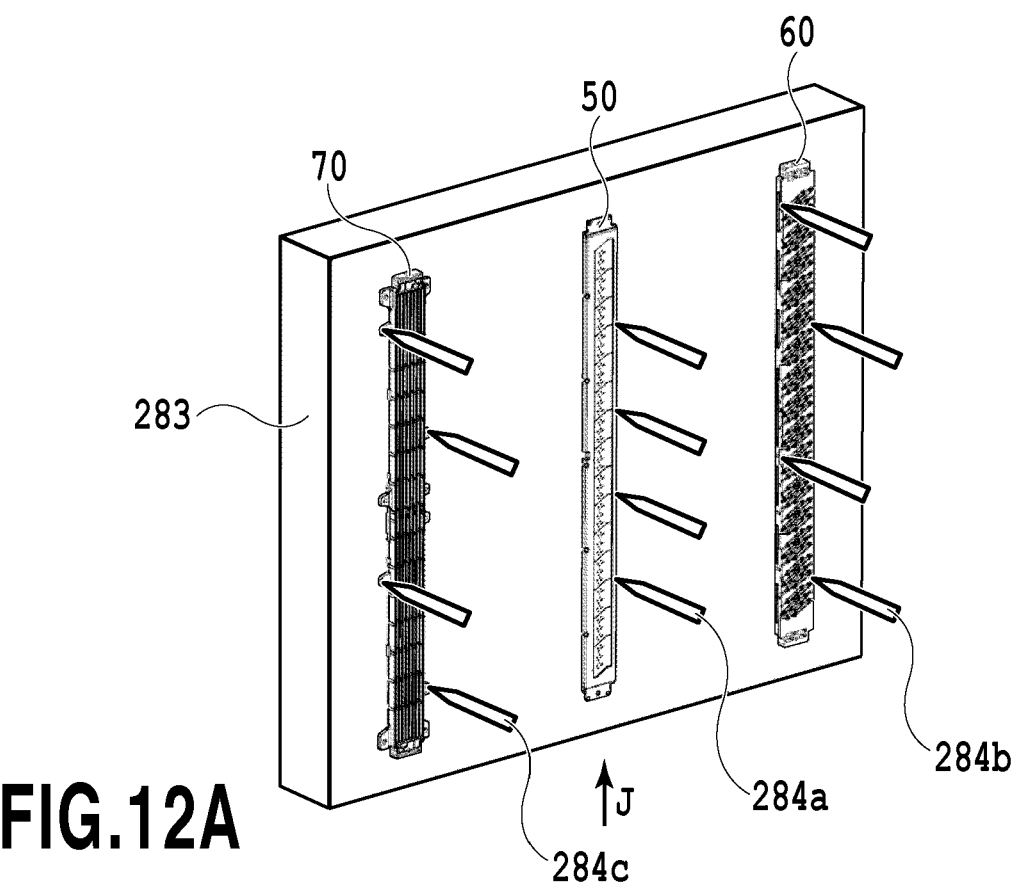
FIGS. 12A and 12B are perspective views of a mold according to the embodiment of the present invention.
Figure 12B:
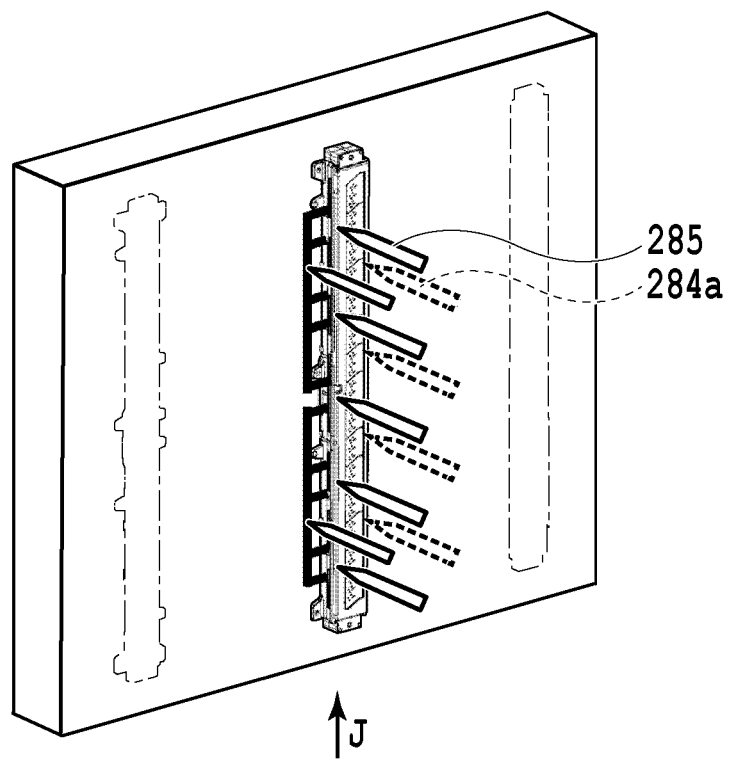
Figure 13:
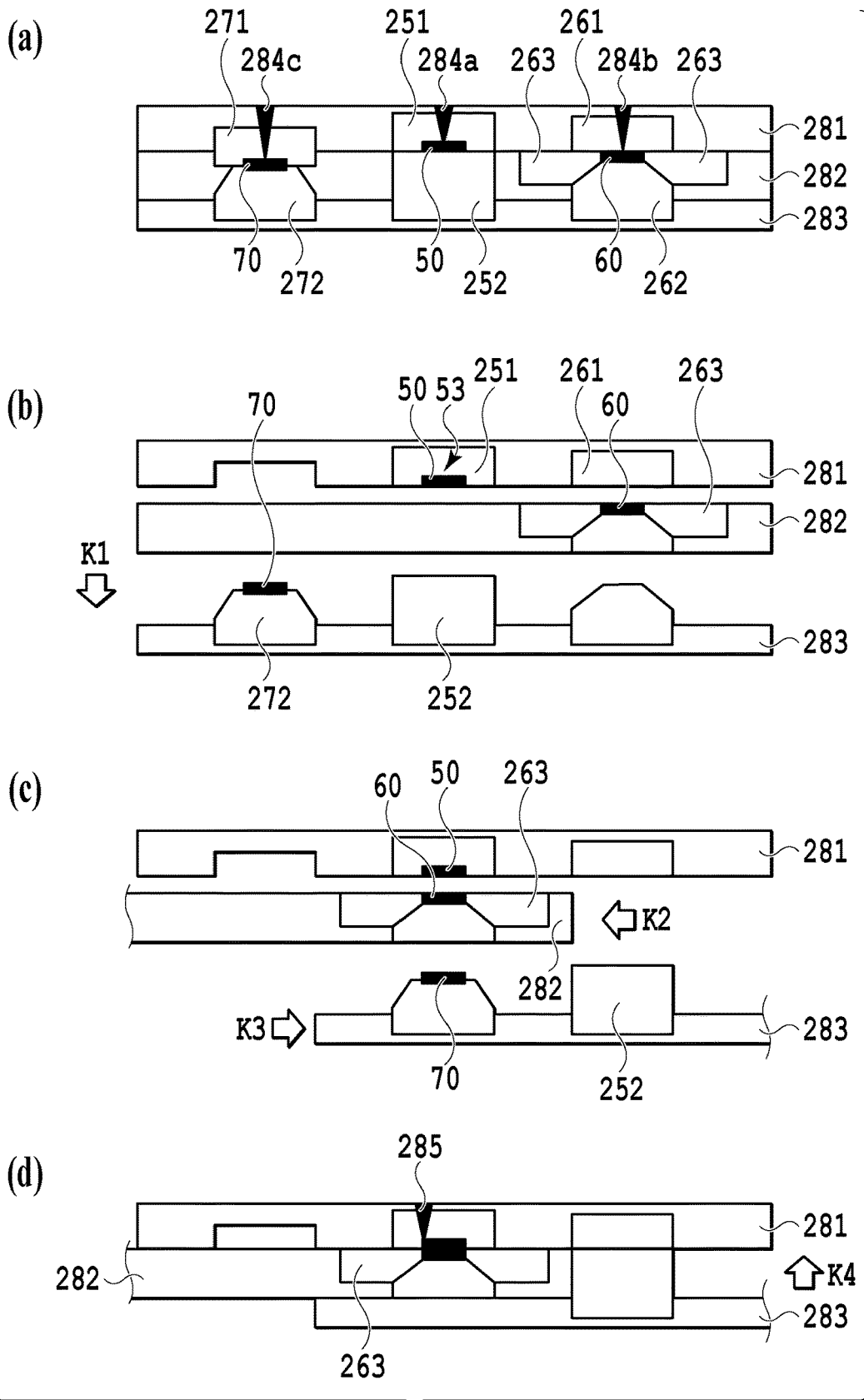
FIG. 13 shows diagrams to explain one manufacturing cycle of injection molding the passage member according to the embodiment of the present invention.

FIGS. 12A and 12B are perspective views showing a mold according to the embodiment of the present invention and components of the passage member 210 to be located inside the mold. The liquid ejecting head of this embodiment is manufactured in accordance with so-called die slide injection molding. FIG. 12A shows positions to mold the first to third passage members (primary molding), while FIG. 12B shows positions to be filled with the sealing material (secondary molding) which serves as a resin filler for bringing the first to third passage members into contact with one another and bonding these passage members to one another. Meanwhile, parts (a) to (c) of FIG. 13 are schematic diagrams for explaining one manufacturing cycle of injection molding of the passage member 210. Each of parts (a) to (c) of FIG. 13 is viewed in the direction of an arrow J in FIGS. 12A and 12B.

One cycle is off to a start in a closed state of the mold that includes a fixed plate (a mold) 281, an intermediate plate (a mold) 282, and a movable plate (a mold) 283 (part (a) of FIG. 13). First, the first passage member 50, the second passage member 60, and the third passage member 70 are injection molded at a first molding position, a second molding position, and a third molding positions, respectively, which are the positions shown in part (a) of FIG. 13 (the primary molding). At this time, a molding resin is injected from valve gates 284a, 284b, and 284c located at the respective molding positions. In this way, the first passage member 50, the second passage member 60, and the third passage member 70 are formed.

Next, the mold is opened by moving the movable plate 283 and the intermediate plate 282 in a direction of an arrow K1 (part (b) of FIG. 13). At this time, the first passage member 50 remains at the current position while being held by a fixed side insert 251 of the fixed plate 281. On the other hand, the second passage member 60 is moved in the state of being held by a slidable holding insert 263 of the intermediate plate 282, while the third passage member 70 is moved in the state of being held by a movable side insert 272 of the movable plate 283.

Then, the intermediate plate 282 and the movable plate 283 in the state of holding the second passage member 60 and the third passage member 70 are moved in directions of arrows K2 and K3 in the drawing to the position of the first passage member 50 held by the fixed plate 281, respectively (part (c) of FIG. 13).

Next, the mold is closed by moving the intermediate plate 282 and the movable plate 283 in a direction of an arrow K4 in the drawing toward the fixed plate 281 (part (d) of FIG. 13). At this time, the first, second, and third passage members come into contact with one another, thereby forming the common passages and the individual passages which are hollow. Then, as described later with reference to FIGS. 14A to 17C, spaces to be filled with the sealing material that are formed around the respective liquid passages are filled with the sealing material which is a resin filler (the secondary molding). The passage member 210 can be formed by integrating the first to third passage members together with the sealing material as described above.

Figure 14A:
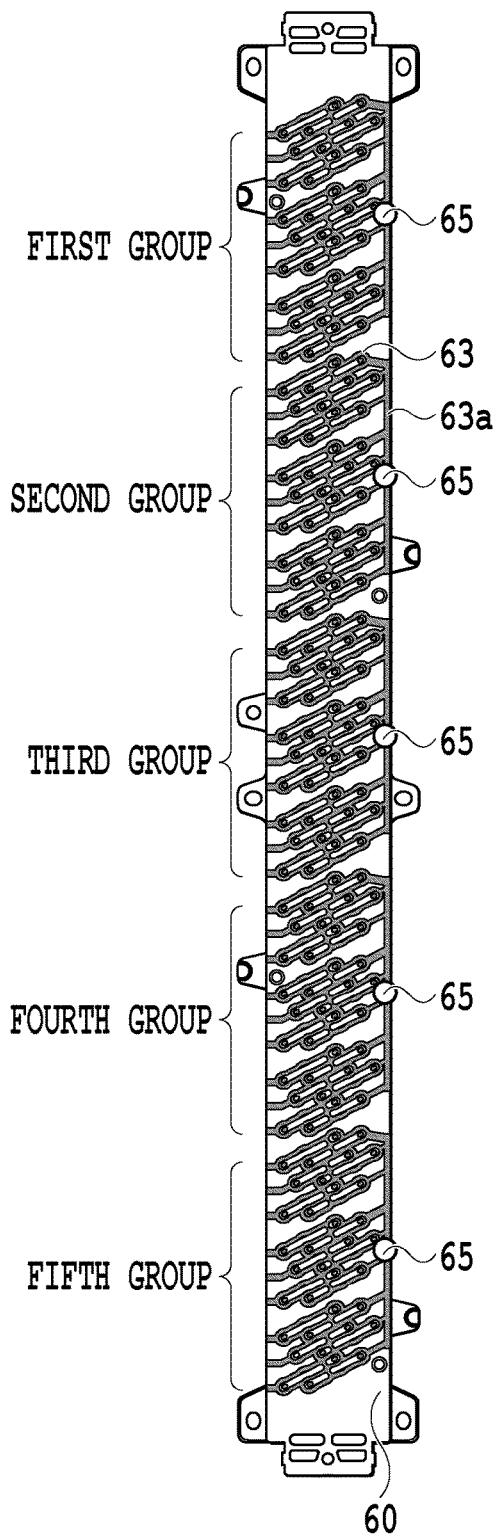
FIGS. 14A and 14B are explanatory diagrams of injection passages when injecting a sealing material into a space between bonding portions of a first passage member and a second passage member, respectively.
Figure 14B:
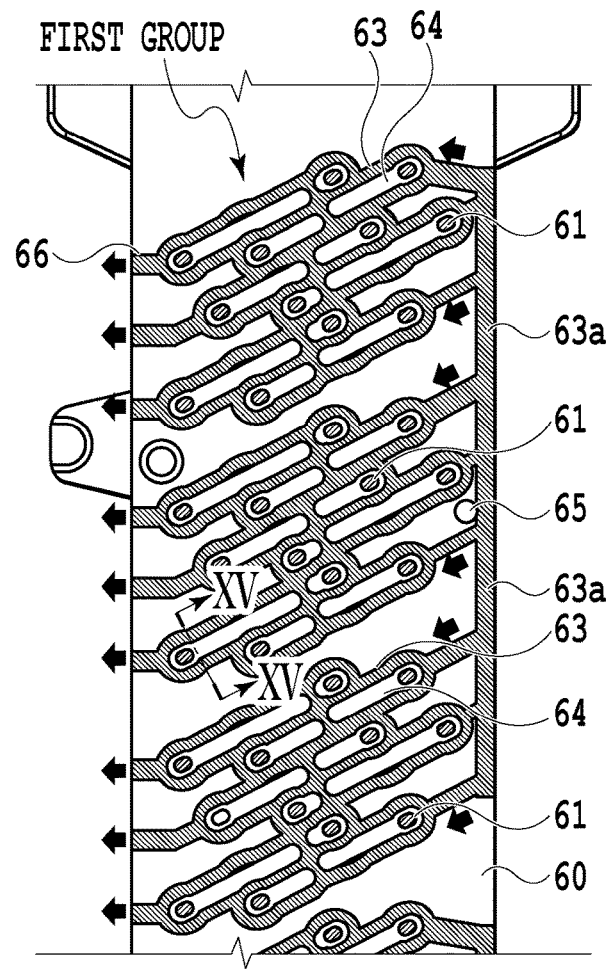
Figure 15:
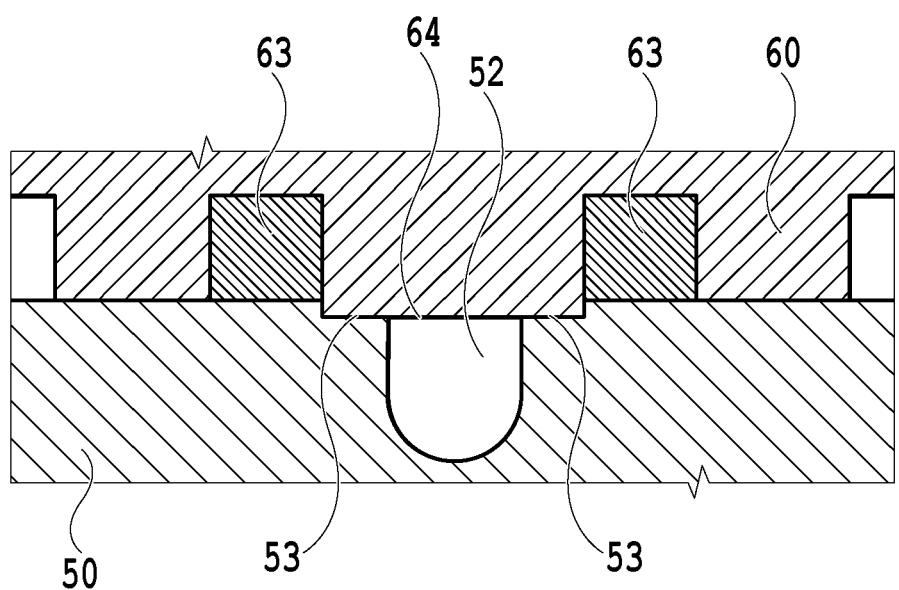
FIG. 15 is a cross-sectional view taken along the XV-XV line in FIG. 14B.

FIGS. 14A and 14B are diagrams showing inflow passages (filled region) when bonding the first passage member 50 to the second passage member 60 and injecting the resin sealing material into spaces between bonding portions thereof, which illustrate grooves and the like that are provided on the second passage member 60 side to constitute the inflow passages. Meanwhile, FIG. 15 is a cross-sectional view showing a section taken along the XV-XV line in FIG. 14B. As schematically described with reference to parts (a) to (f) of FIG. 5, the second passage member 60 is provided with the sealing material grooves 63 for injecting the sealing material for the secondary molding and spreading the sealing material throughout a designed range, in such a way as to correspond to and surround the individual passage grooves 52 in the first passage member 50. As shown in FIG. 15, the individual passages 52 are formed by injecting the sealing material for the secondary molding to a portion in the vicinity of a contact portion (a region adjacent to the contact portion) between the first passage member 50 and the second passage member 60. In the meantime, the communication ports 61 are provided at some parts in a region corresponding to the individual passage grooves 52 of the first passage member 50.

As shown in FIG. 14A, the sealing material grooves 63 are formed as five groups of first to fifth groups. Moreover, as shown in FIG. 14B, each group is provided with a gate 65 used for injecting the sealing material, and branch passages 63a for distributing the sealing material injected through the gate 65 to the respective sealing material grooves in the group. When the individual passages are formed by bonding the first passage member 50 to the second passage member 60, the protruding portions 64 of the second passage member 60 face the individual passage grooves 52 provided in the first passage member 50, thereby forming the individual passages in conjunction with the individual passage grooves 52. Specifically, before the bonding, a portion surrounding each individual passage groove 52 in the first passage member 50 forms a plane located at the same position as an upper end of the groove 52. In this state, the protruding portion 64 of the second passage member 60 pushes in the surface of the surrounding portion, whereby the recessed bottom surface 53 is formed in the first passage member 50.

According to the above-described configuration, when the first passage member 50 is bonded to the second passage member 60, the individual passages are formed and the inflow passages (passages indicated with the sealing material grooves 63 in FIGS. 14A and 14B) to be filled with the injected sealing material are formed around the individual passages. As shown in FIGS. 14A and 14B, the inflow passages are directed from the gate 65 provided on one longitudinal side of the second passage member 60 to the other longitudinal side, and extend in a direction intersecting with the longitudinal direction. As a consequence, the sealing material for the secondary molding injected from the gate reaches portions near the opposite side (final filling end portions 66) while filling the spaces in the inflow passages around the respective individual passage grooves 52. In other words, it is possible to define the inflow passages for the sealing material from the one longitudinal side to the other longitudinal side of the passage member, and thus to reduce the length of the inflow passages as compared to the case of extending the inflow passages in the longitudinal direction of the passage member. As a consequence, it is easy to spread the sealing material, which is necessary for the secondary molding, throughout the inflow region to be filled with the sealing material. In addition, it is possible to reduce a temperature gradient that may develop between the portion in the vicinity of the injecting portion of the inflow passage to be filled with the sealing material and the final end portion of the inflow passage.

Moreover, as a consequence of allowing the sealing material to flow one-way from the gate to the final filling end portions, it is possible to release a gas effectively, to eliminate filling failures, and thus to achieve high bonding reliability. It is to be noted, however, that the final filling end portions do not always have to be consolidated on a lateral surface on one longitudinal side of the passage member. Nonetheless, the consolidation of the final filling end portions on the lateral surface on one longitudinal side is preferred because it is easy to inspect whether or not the secondary molding sealing material has reached every final filling end portion just by checking the lateral surface on the one longitudinal side. Meanwhile, in this embodiment, the direction of the flow of the sealing material to bond the first passage member to the second passage member is inclined with respect to the longitudinal direction. In this way, a projected area of the bonding portions is increased more than the case of feeding the sealing material in an orthogonal direction to the longitudinal direction, whereby bonding strength is enhanced and higher bonding reliability can be achieved. On the other hand, the direction of the flow of the sealing material near the final filling end portions not related to the bonding of the passages is substantially orthogonal to the longitudinal direction. In this way, the sealing material reaches each final filling end portion with the shortest distance after completely sealing the portions around the individual passages. Thus, it is possible to achieve effects including reduction in volume of the sealing material, shortening of the molding cycle, and the like. Here, the number of the gates, the number of the branch passages, and the like may be determined as appropriate depending on the shape of the individual passages, performances of a molding machine used, and the like on the premise of enabling the sealing material for the secondary molding to flow evenly throughout the spreading area.

Figure 16A:
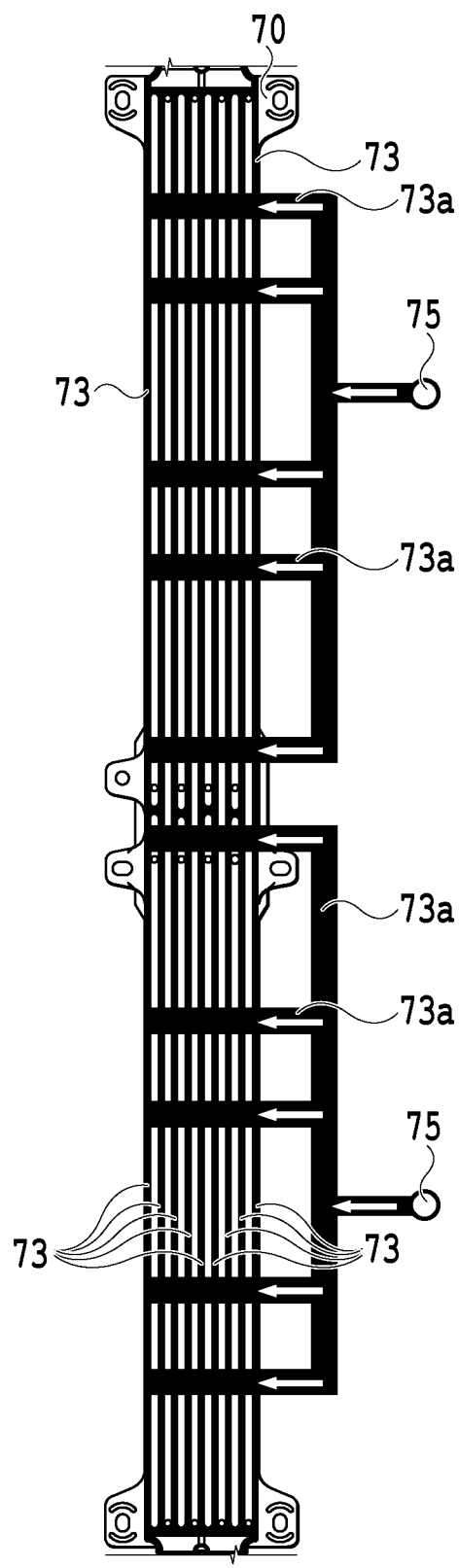
FIGS. 16A and 16B are explanatory diagrams of injection passages when injecting a sealing material into a space between bonding portions of the first passage member and a third passage member, respectively.
Figure 16B:
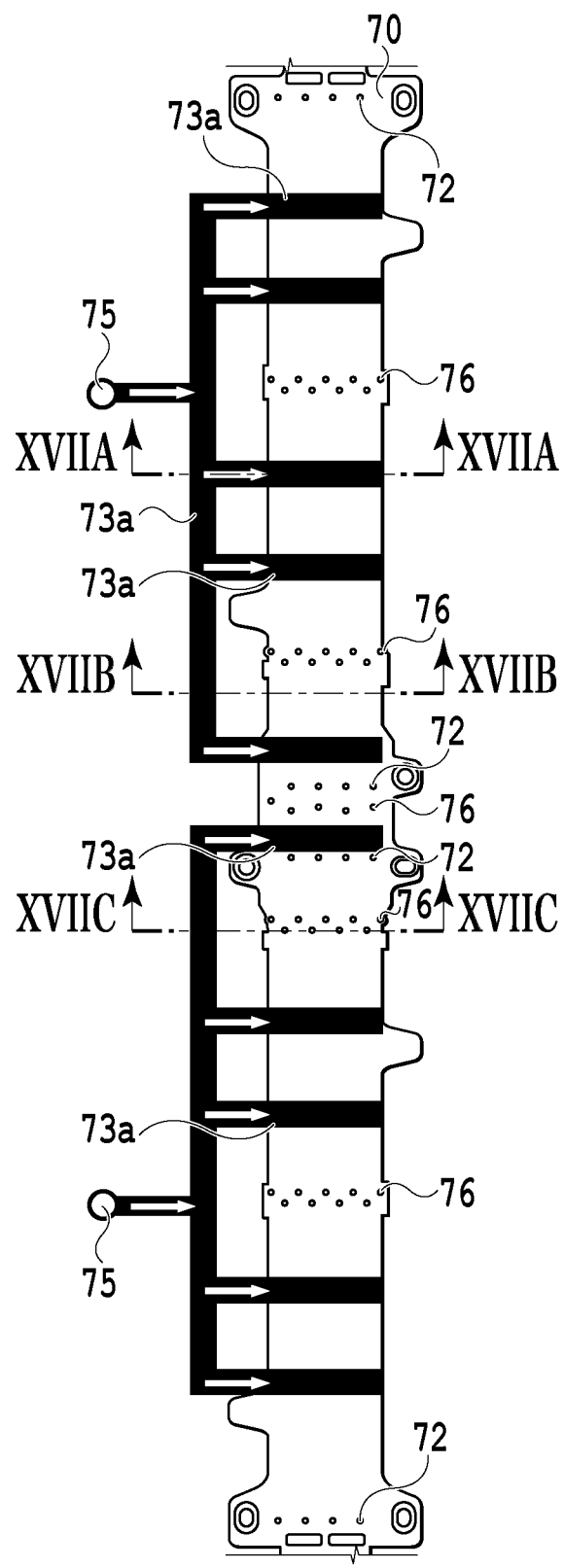
Figure 17A:
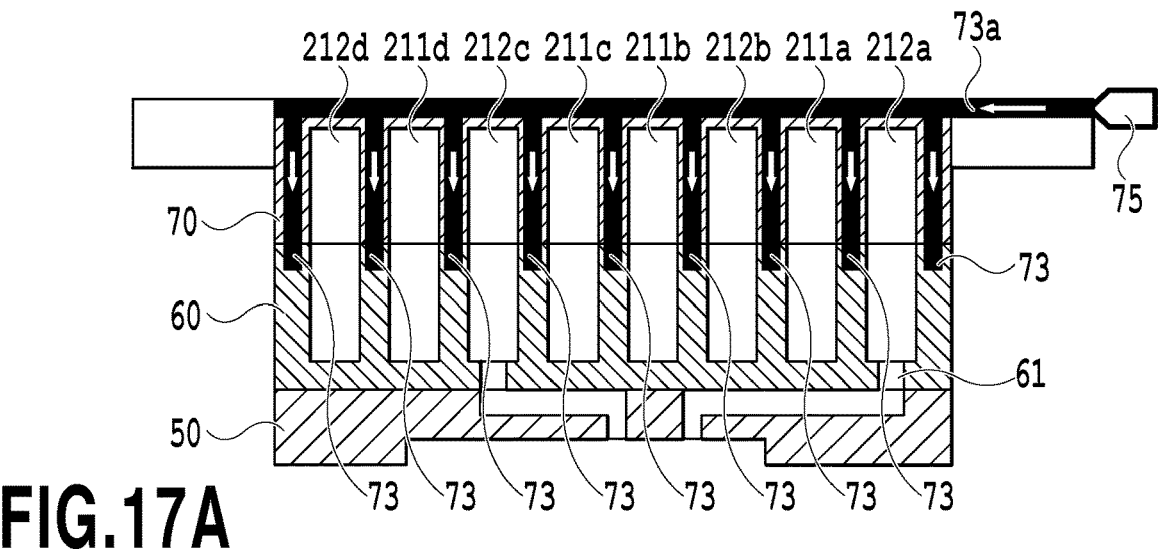
FIGS. 17A, 17B, and 17C are cross-sectional views taken along the XVIIA-XVIIA line, the XVIIB-XVIIB line, and the XVIIC-XVIIC line in FIG. 16B, respectively.
Figure 17B:
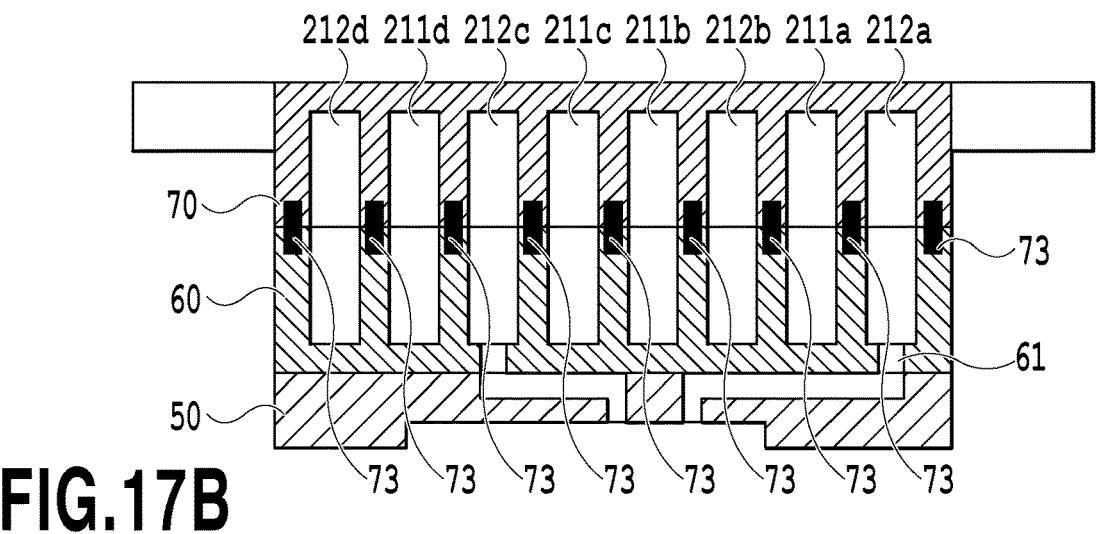
Figure 17C:
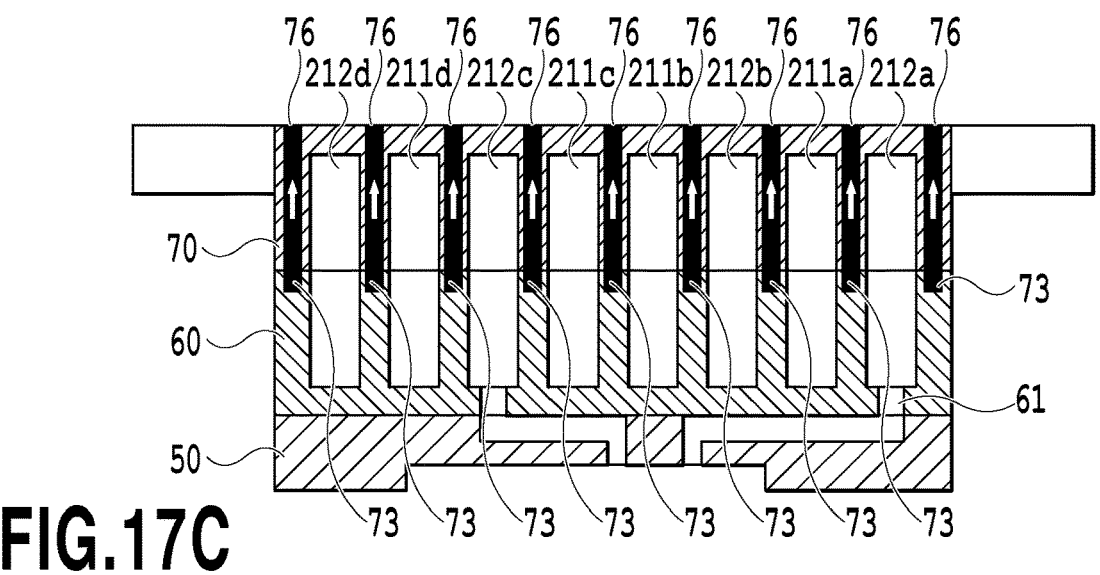

FIGS. 16A and 16B are diagrams showing inflow passages when bonding the second passage member 60 to the third passage member 70 and injecting the sealing material into spaces between bonding portions thereof. Grooves and the like that are provided on the third passage member 70 side to constitute the inflow passages are illustrated in these drawings in a state of being seen through while partially omitting components of the passage member 70. FIG. 16A shows a surface (part (e) of FIG. 5) to be bonded to the second passage member 60 while FIG. 16B shows a surface (part (f) of FIG. 5) to come into contact with the liquid ejecting unit support 81. In the meantime, FIGS. 17A, 17B, and 17C are cross-sectional views taken along the XVIIA-XVIIA line, the XVIIB-XVIIB line, and the XVIIC-XVIIC line in FIG. 16B, respectively.

As shown in FIGS. 16A and 16B, the sealing material for the secondary molding injected from each sealing material injection gates 75 disposed at a corresponding position on the longitudinal side of the passage member 70 flows into and gets filled in nine sealing material grooves (inflow passages) 73 through branch passages 73a, the sealing material grooves 73 corresponding to the four common supply passages 211a to 211d and the four common collection passages 212a to 212d. The injection and filling of this sealing material will be described below in chronological order. First, as shown in FIG. 17A, the sealing material injected from the gate 75 is passed through the branch passages 73a, and flows downward in the sealing material grooves 73, which communicate with the branch passages 73a and extend in the vertical direction in FIG. 17A. Thereafter, the sealing material flows in the sealing material grooves 73 (FIG. 16A), which extend in the longitudinal direction of the passage member 70, along the longitudinal direction. Then, as shown in FIG. 17C, the sealing material flows upward in the sealing material grooves 73 extending in the vertical direction in FIG. 17C and finally reaches gas release holes 76.

The above-described injecting and filling actions of the sealing material in the direction along the bonding surfaces, which involve the bonding portions of the second passage member 60 and the third passage member 70, are directed from the gate 75 provided on the longitudinal side of the third passage member 70 toward the other longitudinal side, and is aligned with the direction intersecting with the longitudinal direction. In this way, the sealing member can flow in with a short distance.

The above-described embodiment relates to the example of molding and bonding the three passage members (the first to third passage members) inside an identical mold. However, the present invention is not limited only to this configuration. For instance, the present invention is also applicable to a case in which two or more passage members are molded and bonded inside an identical mold. In the meantime, the present invention is applicable not only to the passage member of the inkjet printing head but also a wide range of elongated components to be mounted on the inkjet printing apparatus. Moreover, the above-described embodiment employs a pagewide-type liquid ejecting head adaptable to the A3 width, and external dimensions of each of the first passage member 50, the second passage member 60, and the third passage member 70 are about 30 mm widthwise and about 350 mm lengthwise. Nonetheless, the present invention is also applicable to a liquid ejecting head of a larger pagewide type. On the other hand, speaking of smaller dimensions, the present invention is suitably adapted to a pagewide type equivalent to the A4 width or above (about 30 mm widthwise and about 260 mm or above lengthwise).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-228133 filed Nov. 24, 2016, which is hereby incorporated by reference wherein in its entirety.

What is claimed is:

1. A liquid ejecting head comprising:
a passage member being a stacked body that constitutes a passage for a liquid in the liquid ejecting head;
a gate provided on a longitudinal side of the passage member; and
a resin filled in a filled region in the passage member from the gate, the resin constituting a part of the liquid ejection head,
wherein the filled region includes:
at least one first portion extending along the passage; and
a second portion extending from the gate in a direction intersecting a longitudinal direction of the passage member and communicating between the gate and the first portion.

2. The liquid ejecting head according to claim 1, wherein the filled region further includes a third portion extending from the first portion to near another longitudinal side opposite from the longitudinal side where the gate is provided.

3. The liquid ejecting head according to claim 2, wherein the third portion extends in a substantially orthogonal direction to the longitudinal direction.

4. The liquid ejecting head according to claim 1, wherein the at least one first portion comprises a plurality of first portions,
wherein the second portion branches off from the gate into a plurality of passages so as to communicate between the gate and the plurality of first portions, and
wherein the plurality of first portions are arranged so as to be shifted in the longitudinal direction.

5. A liquid ejecting head comprising:
a first passage member and a second passage member that collectively constitute a passage for a liquid in the liquid ejecting head;
a plurality of gates provided on a longitudinal side of at least one of the first passage member and the second passage member; and
a filler in a filled region between the first passage member and the second passage member from the gates, the filler constituting a part of the liquid ejection head.

* * * * *